United States Patent
Zheng et al.

(10) Patent No.: US 10,487,641 B2
(45) Date of Patent: Nov. 26, 2019

(54) WIRELESS EMERGENCY STOP

(71) Applicant: Schlumberger Technology Corporation, Sugar Land, TX (US)

(72) Inventors: Shunfeng Zheng, Katy, TX (US); Joergen K. Johnsen, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 6 days.

(21) Appl. No.: 15/700,499

(22) Filed: Sep. 11, 2017

(65) Prior Publication Data
US 2019/0078429 A1    Mar. 14, 2019

(51) Int. Cl.
| | |
|---|---|
| E21B 44/02 | (2006.01) |
| H04W 4/00 | (2018.01) |
| E21B 44/10 | (2006.01) |
| E21B 44/00 | (2006.01) |

(52) U.S. Cl.
CPC .............. *E21B 44/10* (2013.01); *E21B 44/00* (2013.01); *H04W 4/00* (2013.01); *E21B 44/02* (2013.01)

(58) Field of Classification Search
CPC ........ E21B 44/10; E21B 44/005; E21B 44/02; H04W 4/00
See application file for complete search history.

(56) References Cited

U.S. PATENT DOCUMENTS

| | | | |
|---|---|---|---|
| 4,626,984 A | 12/1986 | Unruh et al. | |
| 6,315,062 B1 | 11/2001 | Alft et al. | |
| 6,519,568 B1 | 2/2003 | Harvey et al. | |
| 6,629,572 B2 | 10/2003 | Womer et al. | |
| 6,944,547 B2 | 9/2005 | Womer et al. | |
| 7,026,950 B2 | 4/2006 | Guggari et al. | |
| 7,677,331 B2 | 3/2010 | Lowe et al. | |
| 8,131,510 B2 | 3/2012 | Wingky et al. | |
| 8,387,720 B1 | 3/2013 | Keast et al. | |
| 10,067,491 B2 | 9/2018 | Wingky et al. | |
| 2010/0147589 A1 | 6/2010 | Wingky | |
| 2010/0250139 A1* | 9/2010 | Hobbs | E21B 47/12 702/6 |
| 2011/0132592 A1* | 6/2011 | Apple | E21B 41/00 166/53 |
| 2011/0162888 A1 | 7/2011 | McHugh et al. | |
| 2011/0232923 A1* | 9/2011 | Barbee | E21B 33/05 166/386 |
| 2012/0138362 A1 | 6/2012 | Koederitz | |
| 2013/0146358 A1 | 6/2013 | DiSantis | |
| 2013/0231781 A1 | 9/2013 | Chapman | |
| 2013/0231787 A1 | 9/2013 | Chapman et al. | |

(Continued)

FOREIGN PATENT DOCUMENTS

| | | |
|---|---|---|
| EP | 2458142 A2 | 5/2012 |
| WO | 2015123045 A1 | 8/2015 |
| WO | 2016130160 A1 | 8/2016 |

*Primary Examiner* — Thomas D Alunkal
(74) *Attorney, Agent, or Firm* — Rachel E. Greene

(57) ABSTRACT

Apparatus and methods for wireless emergency stop of automated machines. A method may include inputting into an electrical control system association information indicative of which one or more of a plurality of electronically controlled automated machines at a worksite are to be associated with a wireless communicator, and operating the wireless communicator to cause the one or more associated machines to stop operating.

20 Claims, 8 Drawing Sheets

(56) References Cited

U.S. PATENT DOCUMENTS

| | | | |
|---|---|---|---|
| 2014/0077964 A1* | 3/2014 | Beligere | E21B 47/00 340/853.3 |
| 2014/0104074 A1* | 4/2014 | Hickman | E21B 33/0355 340/854.6 |
| 2014/0320296 A1* | 10/2014 | Thurber | G08B 21/14 340/632 |
| 2015/0351260 A1* | 12/2015 | Meftah | H01H 3/022 361/728 |
| 2016/0076356 A1* | 3/2016 | Krems | G05B 19/05 700/275 |
| 2016/0282845 A1* | 9/2016 | Toda | G05B 19/409 |
| 2017/0002649 A1 | 1/2017 | Sund | |
| 2017/0075329 A1* | 3/2017 | Whittaker | G05B 9/02 |

\* cited by examiner

WIRELESS EMERGENCY STOP

BACKGROUND OF THE DISCLOSURE

Wells are generally drilled into the ground or ocean bed to recover natural deposits of oil and gas, and other desirable materials that are trapped in subterranean formations. Such wells are drilled into the subterranean formations using a drill bit attached to a lower end of a drill string. Drilling fluid is pumped from a wellsite surface down through the drill string to the drill bit. The drilling fluid lubricates and cools the drill bit, and carries drill cuttings from the wellbore to the wellsite surface.

Such well construction process utilizes a plurality of automated machines operating in a coordinated manner. Although the automated machines increase efficiency of the well construction process, the automated machines pose a safety hazard to wellsite personnel (e.g., drillers, roughnecks). As an increasing number of well construction equipment is automated, it becomes more common for the wellsite personnel to work alongside such well construction machines or systems, increasing rates of injuries to the wellsite personnel caused by the automated machines or systems. For example, serious injuries may be caused to wellsite personnel who, while working alongside an automated machine, are struck or pushed by automated machines executing an automated sequence during well construction operations.

A typical safety system (i.e., an emergency stop system) comprises one or more emergency stop buttons hardwired to a control station, which may be located at a distance from the automated machines performing the well construction operations. In case of an emergency, wellsite personnel standing in close proximity to the control station are able operate the emergency stop button to halt the automated sequence. However, wellsite personnel working alongside the automated machines are typically not in close proximity to the control station and/or do not have easy access to the emergency stop buttons. Accordingly, wellsite personnel working alongside the automated machines during well construction operations are exposed to substantial safety hazards.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a wireless communicator, a wireless access point, and a control system. The wireless communicator is to be worn by an ambulatory human at a wellsite, and is operable to transmit a wireless signal. The wireless access point is located at the wellsite, and is operable to receive the wireless signal and output an electrical signal based on the received wireless signal. The control system is located at the wellsite and includes a processor and a memory storing computer program code. The control system is operable to electrically communicate with electronically controlled machines collectively operable for construction of an oil and/or gas well at the wellsite. The control system is also operable associate one of the machines with the wireless communicator, receive the electrical signal, and cause the associated machine to stop operating based on receipt of the electrical signal.

The present disclosure also introduces a method including inputting, into an electrical control system, association information indicative of which one or more electronically controlled automated machines at a worksite are to be associated with a wireless communicator. The method also includes operating the wireless communicator to cause the one or more associated machines to stop operating.

The present disclosure also introduces a method including operating an electrical control system at a worksite to stop operations of one or more electronically controlled automated machines associated with a wireless communicator. Such operations include associating one or more of the machines with the wireless communicator, and operating the wireless communicator to transmit a wireless signal to cause the electrical control system to stop operation of the one or more associated machines.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
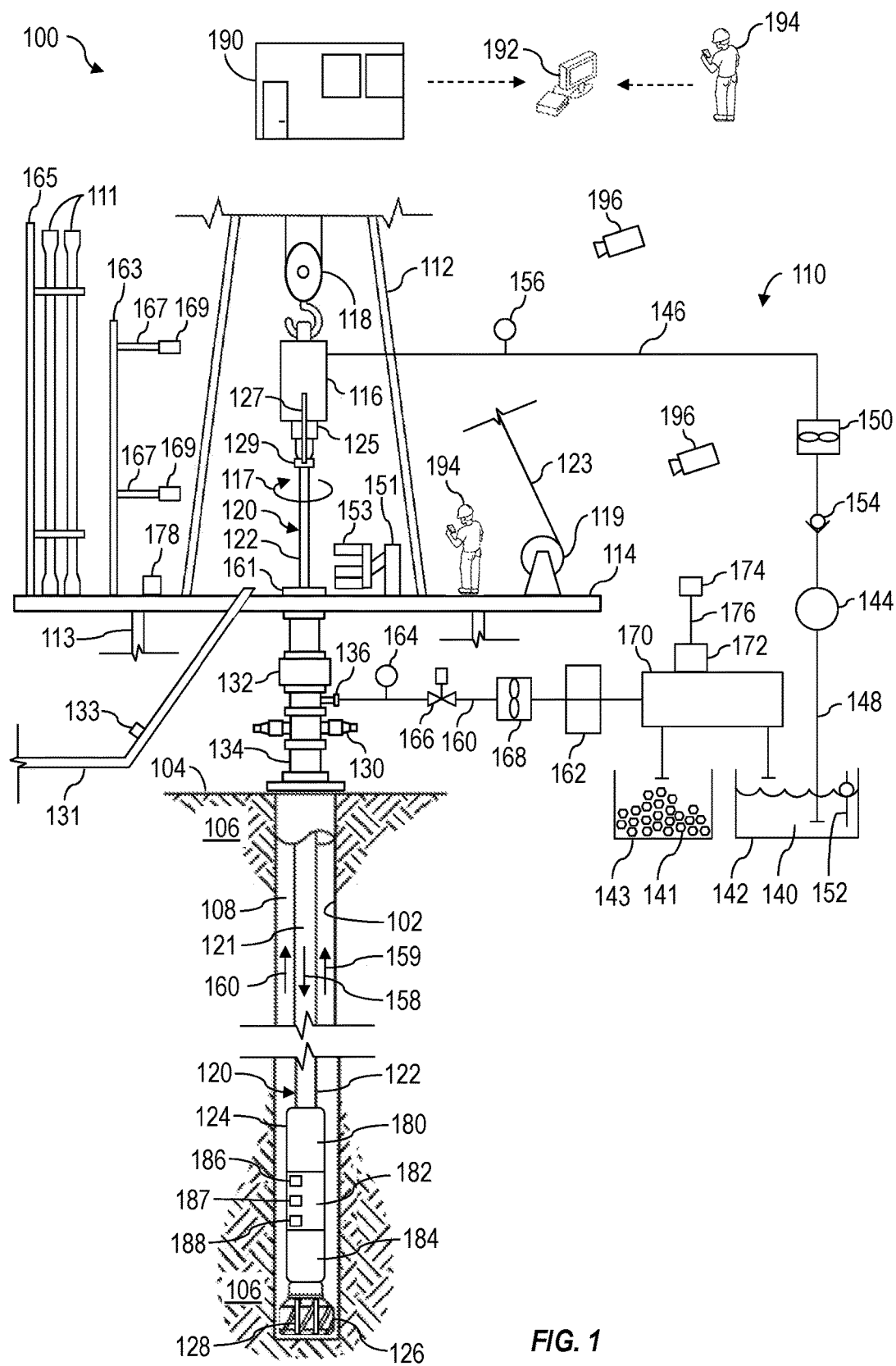
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example implementation of a well construction system 100 according to one or more aspects of the present disclosure. The well construction system 100 represents an example environment in which one or more aspects described below may be implemented. It is also noted that although the well construction system 100 is depicted as an onshore implementation, it is understood that the aspects described below are also generally applicable to offshore and inshore implementations.

The well construction system 100 is depicted in relation to a wellbore 102 formed by rotary and/or directional drilling from a wellsite surface 104 and extending into a subterranean formation 106. The well construction system 100 includes surface equipment 110 located at the wellsite surface 104 and a drill string 120 suspended within the wellbore 102. The surface equipment 110 may include a mast, a derrick, and/or another wellsite structure 112 disposed over a rig floor 114. The wellsite structure 112 and the rig floor 114 are collectively supported over the wellbore 102 by a plurality of legs or other support structures 113. The drill string 120 may be suspended within the wellbore 102 from the wellsite structure 112.

The drill string 120 may comprise a BHA 124 and means 122 for conveying the BHA 124 within the wellbore 102. The conveyance means 122 may comprise drill pipe, heavy-weight drill pipe (HWDP), wired drill pipe (WDP), tough logging condition (TLC) pipe, coiled tubing, and/or other means of conveying the BHA 124 within the wellbore 102. A downhole end of the BHA 124 may include or be coupled to a drill bit 126. Rotation of the drill bit 126 and the weight of the drill string 120 may collectively operate to advance the BHA 124 into the formation 106 to form the wellbore 102. The drill bit 126 may be rotated from the wellsite surface 104 and/or via a downhole mud motor (not shown) connected with the drill bit 126.

The BHA 124 may also include various downhole tools 180, 182, 184. One or more of such downhole tools 180, 182, 184 may be or comprise an acoustic tool, a density tool, a directional drilling tool, an electromagnetic (EM) tool, a sampling while drilling (SWD) tool, a formation testing tool, a formation sampling tool, a gravity tool, a monitoring tool, a neutron tool, a nuclear tool, a photoelectric factor tool, a porosity tool, a reservoir characterization tool, a resistivity tool, a seismic tool, a surveying tool, and/or a tough logging condition (TLC) tool, although other downhole tools are also within the scope of the present disclosure. One or more of the downhole tools 180, 182, 184 may also be implemented as a measuring-while-drilling (MWD) or logging-while-drilling (LWD) tool for the acquisition and/or transmission of downhole data to the surface equipment 110.

The downhole tool 182 may be or comprise the MWD or LWD tool comprising a sensor package 186 operable for the acquisition of measurement data pertaining to the BHA 124, the wellbore 102, and/or the formation 106. The downhole tool 182 and/or another portion of the BHA 124 may also comprise a telemetry device 187 operable for communication with the surface equipment, such as via mud-pulse telemetry. The downhole tool 182 and/or another portion of the BHA 124 may also comprise a downhole processing device 188 operable to receive, process, and/or store information received from the surface equipment, the sensor package 186, and/or other portions of the BHA 124. The processing device 188 may also store executable programs and/or instructions, including for implementing one or more aspects of the operations described herein.

The wellsite structure 112 may support a top drive 116 operable to connect with an uphole end of the conveyance means 122 and impart rotary motion 117 to the conveyance means 122, the drill string 120, and the drill bit 126. However, a kelly and rotary table (neither shown) may be utilized instead of or in addition to the top drive 116 to impart the rotary motion 117. The top drive 116 and the connected drill string 120 may be suspended from the wellsite structure 112 via hoisting equipment, which may include a traveling block 118, a crown block (not shown), and a drawworks 119 storing a support cable or line 123. The crown block may be connected to or otherwise supported by the wellsite structure 112 and the traveling block 118 may be coupled with the top drive 116, such as via a hook. The drawworks 119 may be mounted on or otherwise supported by the rig floor 114. The crown block and traveling block 118 may comprise one or more pulleys or sheaves, whereby the support line 123 may be reeved around the pulleys or sheaves to operatively connect the crown block and the traveling block 18. The support line 123 may extend from the crown block to the drawworks 119, which may selectively impart tension to the support line 123 to lift and lower the top drive 116. The drawworks 119 may comprise a drum, a frame, and a prime mover (e.g., an engine or motor) (not shown) operable to drive the drum to rotate and reel in the support line 123, which in turn may cause the traveling block 118 and top drive 116 to move upward. The drawworks 119 may be operable to release the support line 123 via a controlled rotation of the drum, which in turn may cause the traveling block 118 and top drive 116 may move downward.

The top drive 116 may include a grabber, a swivel (neither shown), a tubular handling assembly 127 terminating with an elevator 129, and a drive shaft 125 operatively connected with a prime mover (not shown). The drill string 120 may be mechanically coupled to the drive shaft 125 (e.g., with or without a sub saver between the drill string 120 and the drive shaft 125). The prime mover may drive the drive shaft 125, such as through a gear box or transmission (not shown), to rotate the drive shaft 125 and, therefore, the drill string 120, which in conjunction with operation of the drawworks 119, may advance the drill string 120 into the formation 106 and form the wellbore 102. The tubular handling assembly 127 and elevator 129 may permit the top drive 116 to handle tubulars (e.g., drill pipes, drill collars, casing joints, and the like, that are not mechanically coupled to the drive shaft 125). For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the drive shaft 125. The top drive 116 may have a guide system (not shown), such as rollers that track up and down a guide rail (not shown) on the wellsite structure 112. The guide system may aid in keeping the top drive 116 aligned with the wellbore 102 and in preventing the top drive 116 from rotating during drilling by transferring the reactive torque from the drill string 120 to the wellsite structure 112.

The drill string 120 may be conveyed within the wellbore 102 through a plurality of well control devices disposed at the wellsite surface 104 on top of the wellbore 102 below the rig floor 114. The well control devices may be operable to control pressure within the wellbore 102 via a series of pressure barriers formed between the wellbore 102 and the wellsite surface 104. The well control devices may include a blowout preventer (BOP) stack 130 and an annular fluid control device 132, such as an annular preventer and/or a rotating control device (RCD). The well control devices may be mounted on top of a wellhead 134.

The well construction system 100 may further include a drilling fluid circulation system operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding drilling fluid 140, and a pump 144 operable to move the drilling fluid 140 from the container 142 into the fluid passage 121 of the drill string 120 via a fluid conduit 146 extending from the pump 144 to the top drive 116 and an internal passage extending through the top drive 116. The fluid conduit 146 may comprise one or more of a pump discharge line, a stand pipe, a rotary hose, and a gooseneck (none shown) connected with a fluid inlet of the top drive 116. The pump 144 and the container 142 may be fluidly connected by a fluid conduit 148.

A flow rate sensor 150 may be operatively connected along the fluid conduit 146 to measure flow rate of the drilling fluid 140 being pumped downhole. The flow rate sensor 150 may be operable to measure volumetric and/or mass flow rate of the drilling fluid 140. The flow rate sensor 150 may be an electrical flow rate sensor operable to generate an electrical signal and/or information indicative of the measured flow rate. The flow rate sensor 150 may be a Coriolis flowmeter, a turbine flowmeter, or an acoustic flowmeter, among other examples. A fluid level sensor 152 may be mounted or otherwise disposed in association with the container 142 and operable to measure level of the drilling fluid 140 within the container 142. The fluid level sensor 152 may be an electrical fluid level sensor operable to generate signals or information indicative of the amount (e.g., level, volume) of drilling fluid 140 within the container 142. The fluid level sensor 152 may comprise conductive, capacitive, vibrating, electromechanical, ultrasonic, microwave, nucleonic, and/or other example sensors. A flow check valve 154 may be connected downstream from the pump 144 to prevent the drilling or other fluids from backing up through the pump 144. A pressure sensor 156 may be connected along the fluid conduit 146, such as to measure pressure of the drilling fluid 140 being pumped downhole. The pressure sensor 156 may be connected close to the top drive 116, such as may permit the pressure sensor 156 to measure pressure within the drill string 120 at the top of the internal passage 121 or otherwise proximate the wellsite surface 104. The pressure sensor 156 may be an electrical sensor operable to generate electric signals and/or other information indicative of the measured pressure.

During drilling operations, the drilling fluid may continue to flow downhole through the internal passage 121 of the drill string 120, as indicated by directional arrow 158. The drilling fluid may exit the BHA 124 via ports 128 in the drill bit 126 and then circulate uphole through an annular space ("annulus") 108 of the wellbore 102 defined between an exterior of the drill string 120 and the wall of the wellbore 102, as indicated by directional arrows 159. In this manner, the drilling fluid lubricates the drill bit 126 and carries formation cuttings uphole to the wellsite surface 104. The drilling fluid may exit the annulus 108 via a wing valve, a bell nipple, or another ported adapter 136. The ported adapter 136 may be disposed below the annular fluid control device 132, above the BOP stack 130, or at another location along the well control devices permitting ported access or fluid connection with the annulus 108.

During drilling operations, the drilling fluid exiting the annulus 108 via the ported adapter 136 may be directed into a fluid conduit 160 and pass through various pieces of surface equipment 110 fluidly connected along the conduit 160, prior to being returned to the container 142 to be recirculated into the wellbore 102. For example, the drilling fluid may pass through a choke manifold 162 connected along the conduit 160. The choke manifold 162 may include at least one choke and a plurality of fluid valves (neither shown) collectively operable to control flow of the drilling fluid through the choke manifold 162. Backpressure may be applied to the annulus 108 by variably restricting flow of the drilling fluid or other fluids flowing through the choke manifold 162. The greater the restriction to flow through the choke manifold 162, the greater the backpressure applied to the annulus 108. Thus, downhole pressure (e.g., pressure at the bottom of the wellbore 102 around the BHA 124 or at a particular depth along the wellbore 102) can be regulated by varying the backpressure at an upper (i.e., uphole) end (e.g., within an upper portion) of the annulus 108 proximate the wellsite surface 104. Pressure maintained at the upper end of the annulus 108 may be measured via a pressure sensor 164 connected along the conduit 160 between the ported adapter 136 and the choke manifold 162 and, thus, in communication with the upper end of the annulus 108. A fluid valve 166 may be connected along the conduit 160 to selectively fluidly isolate the annulus 108 from the choke manifold 162 and/or other surface equipment 110 fluidly connected with the conduit 160. The fluid valve 166 may be or comprise fluid shut-off valves, such as ball valves, globe valves, and/or other types of fluid valves, which may be selectively opened and closed to permit and prevent fluid flow therethrough. The fluid valve 166 may be actuated remotely by a corresponding actuator operatively coupled with the fluid valve 166. The actuator may be or comprise an electric actuator, such as a solenoid or motor, or a fluid actuator, such as pneumatic or hydraulic cylinder or rotary actuator. The fluid valve 166 may also or instead be actuated manually, such as by a corresponding lever. A flow rate sensor 168 may be connected along the fluid conduit 160 to monitor flow rate of the drilling fluid or another fluid being discharged from the wellbore 102.

Before being returned to the container 142, the drilling fluid may be cleaned and/or reconditioned by solids and gas control equipment 170, which may include one or more of shakers, separators, centrifuges, and other drilling fluid cleaning devices. The solids control equipment 170 may be operable for separating and removing solid particles 141 (e.g., drill cuttings) from the drilling fluid returning to the surface 104. The solids and gas control equipment 170 may also comprise fluid reconditioning equipment, such as may remove gas and/or finer formation cuttings 143 from the drilling fluid. The fluid reconditioning equipment may include a desilter, a desander, a degasser 172, and/or the like. The degasser 172 may form or be mounted in association with one or more portions of the solids and gas control equipment 170. The degasser 172 may be operable for releasing and/or capturing formation gasses entrained in the drilling fluid discharged from the wellbore 102. The degasser 172 may be fluidly connected with one or more gas sensors 174 (e.g., gas detectors and/or analyzers) via a fluid conduit 176, such as may permit the formation gasses released and/or captured by the degasser 172 to be directed to and analyzed by the gas sensors 174. The gas sensors 174 may be operable for generating signals or information indicative of the presence and/or quantity of formation gasses released and/or captured by the degasser 172. The gas sensors 174 may be or comprise qualitative gas analyzers, which may be utilized for safety purposes, such as to detect presence of hazardous gases entrained within the drilling fluid. The gas sensors 174 may also or instead be or comprise quantitative gas analyzers, which may be utilized to detect levels or quantities of certain formation gasses, such as to perform formation evaluation. One or more gas sensors 178 (e.g., qualitative gas analyzers) may also or instead be located at the rig floor 114, such as to detect hazardous gasses being released from the wellbore 102.

During fluid treatment operations, the particle-free and gas-free drilling fluid may be transferred to the fluid container 142 while the solid particles 141 may be transferred to a solids container 143 (e.g., a reserve pit). In some examples, intermediate containers (i.e., tanks) (not shown) may be utilized to hold the drilling fluid 140 between the various portions of the solids and gas control equipment 170. The container 142 may include an agitator (not shown) to maintain uniformity of the drilling fluid 140 contained therein. A hopper (not shown) may be disposed in a flowline between the container 142 and the pump 144 to introduce a chemical additive, such as caustic soda, into the drilling fluid 140.

The surface equipment 110 may further include other tubular handling equipment operable to store, move, connect, and disconnect tubulars to assemble and disassemble the conveyance means 122 of the drill string 120 during drilling operations. For example, a catwalk 131 may be utilized to convey tubulars from a ground level, such as along the wellsite surface 104, to the rig floor 114, permitting the tubular handling assembly 127 to grab and lift the tubulars above the wellbore 102 for connection with previously deployed tubulars. The catwalk 131 may have a horizontal portion and an inclined portion that extends between the horizontal portion and the rig floor 114. The catwalk 131 may comprise a skate 133 movable along a groove (not shown) extending longitudinally along the horizontal and inclined portions of the catwalk 131. The skate 133 may be operable to convey (e.g., push) the tubulars along the catwalk 131 to the rig floor 114. The skate 133 may be driven along the groove by a drive system, such as a pulley system or a hydraulic system, among other examples. Additionally, one or more racks (not shown) may adjoin the horizontal portion of the catwalk 131. The racks may have a spinner unit (not shown) for transferring tubulars to the groove of the catwalk 131.

An iron roughneck 151 may be positioned on the rig floor 114. The iron roughneck 151 may comprise a torqueing portion 153, such as may include a spinner and a torque wrench comprising a lower tong and an upper tong. The torqueing portion 153 of the iron roughneck 151 may be moveable toward and at least partially around the drill string 120, such as may permit the iron roughneck 151 to make up and break out a connection of the drill string 120. The torqueing portion 153 may also be moveable away from the drill string 120, such as may permit the iron roughneck 151 to move clear of the drill string 120 during drilling operations. The spinner of the iron roughneck 151 may be utilized to apply low torque to make up and break out threaded connections between tubulars of the drill string 120, while the torque wrench may be utilized to apply a higher torque to tighten and loosen the threaded connections.

A reciprocating slip 161 may be located on the rig floor 114, such as may accommodate therethrough the conveyance means 122 during make up and break out operations and during the drilling operations. The reciprocating slip 161 may be in an open position during drilling operations to permit advancement of the drill string 120 therethrough, and the reciprocating slip 161 may be in a closed position to clamp an upper end of the conveyance means 122 (e.g., assembled tubulars) to suspend the drill sting 120 and prevent advancement of the drill string 120 within the wellbore 102, such as during the make up and break out operations.

During drilling operations, the hoisting equipment may lower the drill string 120 while the top drive 116 rotates the drill string 120 to advance the drill string 120 downward within the wellbore 102 and through the formation 106. During the advancement of the drill string 120, the reciprocating slip 161 is in an open position, and the iron roughneck 151 is moved away or is otherwise clear of the drill string 120. When the upper portion of the tubular in the drill string 120 that is made up to the top drive 116 is near to the reciprocating slip 161 and/or rig floor 114, the top drive 116 ceases rotating the drill string 120 and the reciprocating slip 161 closes to clamp the conveyance means 122. The grabber of the top drive 116 clamps the upper portion of the tubular made up to the drive shaft 125. Once clamped, the drive shaft 125 rotates in a direction reverse from the drilling rotation to break out the connection between the drive shaft 125 and the drill string 120. The grabber of the top drive 116 may then release the tubular of the drill string 120.

Multiple tubulars may be loaded on the rack of the catwalk 131 and individual tubulars may be transferred from the rack to the groove in the catwalk 131, such as by the spinner unit. A tubular positioned in the groove may be conveyed along the groove by the skate 133. As the tubular is conveyed (e.g., pushed) along the groove by the skate 133, an end of the tubular may reach the inclined portion of the catwalk 131 and be conveyed along the incline to the rig floor 114. After the tubular is conveyed such that an end of the tubular projects above the rig floor 114, the elevator 129 may be able to grasp around the end of the tubular permitting the drawworks 119 to lift the tubular via the top drive 116.

With the connection between the drill string 120 and the drive shaft 125 broken out and with the elevator 129 grasping the tubular, the hoisting equipment may raise the elevator 129 to raise the traveling block 118 and, thus, the top drive 116, the elevator 129, and the tubular. The tubular suspended by the elevator 129 may be aligned with the upper portion of the drill string 120. The iron roughneck 151 may be moved toward the drill string 120 and the lower tong of the torqueing portion 153 may clamp onto the upper portion of the drill string 120. The spinning system may then rotate the suspended tubular (e.g., a threaded male connector) into the upper portion of the drill string 120 (e.g., a threaded female connector). Once the spinning system has provided the low torque rotation to make up the connection between the suspended tubular and the upper portion of the drill string 120, the upper tong may clamp onto the suspended tubular and rotate the suspended tubular with high torque to complete making up the connection between the suspended tubular and the drill string 120. In this manner, the suspended tubular becomes a part of the conveyance means 122 of the drill string 120. The iron roughneck 151 may then release the drill string 120 and move clear of the drill string 120.

The grabber of the top drive 116 may then clamp onto the drill string 120. The drive shaft 125 (e.g., a threaded male connector) may be brought into contact with the drill string 120 (e.g., a threaded female connector) and rotated to make up a connection between the drill string 120 and the drive shaft 125. The grabber may then release the drill string 120, and the reciprocating slip 161 may be operated to the open position. Drilling operations may then resume.

The tubular handling equipment may further include a tubular handling manipulator (PHM) 163 disposed in association with a fingerboard 165. Although the PHM 163 and the fingerboard 165 are shown supported on the rig floor 114, it is to be understood that one or both of the PHM 163 and fingerboard 165 may be located on the wellsite surface 104 or another area of the well construction system 100. The fingerboard 165 provides storage (e.g., temporary storage) of tubulars 111 during various operations, such as during and between tripping out and tripping in the drill string 120. The PHM 163 may be operable to transfer the tubulars 111 between the fingerboard 165 and the drill string 120 (i.e., space above the suspended drill string 120). For example, the PHM 163 may include arms 167 terminating with clamps 169, such as may be operable to grasp and/or clamp onto one of the tubulars 111. The arms 167 of the PHM 163 may extend and retract and/or at least a portion of the PHM 163 may be rotatable and/or movable toward and away from the drill string 120, such as may permit the PHM 163 to transfer the tubular 111 between the fingerboard 165 and the drill string 120.

To trip out the drill string 120, the hoisting equipment may raise the top drive 116, the reciprocating slip 161 may close to clamp the drill string 120, and the elevator 129 may close around the drill string 120. The grabber of the top drive 116 may then clamp the upper portion of the tubular made up to the drive shaft 125. Once clamped, the drive shaft 125 may rotate in a direction reverse from the drilling rotation to break out the connection between the drive shaft 125 and the drill string 120. The grabber of the top drive 116 may then release the tubular of the drill string 120, and the drill string 120 may be suspended, at least in part, by the elevator 129. The iron roughneck 151 may be moved toward the drill string 120. The lower tong may clamp onto a lower tubular below a connection of the drill string 120, and the upper tong may clamp onto an upper tubular above the connection of the drill string 120. The upper tong may then rotate the upper tubular to provide a high torque to break out the connection between the upper and lower tubulars. Once the high torque has been provided, the spinning system may rotate the upper tubular to break out the connection, and the upper tubular may be suspended above the rig floor 114 by the elevator 129. The iron roughneck 151 may then release the drill string 120 and move clear of the drill string 120.

The PHM 163 may then move toward the tool string 120 to grasp with the clamps 169 the tubular suspended from the elevator 129. Once the clamps 169 have grasped the suspended tubular, the elevator 129 may open to release the tubular. The PHM 163 may then move away from the tool string 120 while grasping the tubular with the clamps 169, place the tubular in the fingerboard 165, and release the tubular to store the tubular in the fingerboard 165.

Once the tubular that was suspended by the elevator 129 is clear from the top drive 116, the top drive 116 may be lowered and the elevator 129 may grasp an upper portion of the drill string 120 projecting above the reciprocating slip 161 and/or rig floor 114. The reciprocating slip 161 may then be opened and the elevator 129 raised utilizing the hoisting equipment to raise the drill string 120. Once raised, the reciprocating slip 161 may close to clamp the drill string 120. The iron roughneck 151 may move to the drill string 120 and break out a subsequent connection between tubulars, as described above. The PHM 163 may then grasp the suspended tubular and place the tubular in the fingerboard 165, as described above. This process may be repeated until a full length of the drill string 120 is removed from the wellbore 102.

To trip in the drill string 120, the process described above for tripping out the drill string 120 may be reversed. To summarize, the PHM 163 may grasp a tubular (e.g., one of the tubulars 111) from the fingerboard 165 and transfer the tubular to the elevator 129 that grasps the tubular. If no portion of the drill string 120 has been advanced into the wellbore 102, the suspended tubular may be advanced into the wellbore 102 by lowering the elevator 129. If a portion of the drill string 120 has been advanced into the wellbore 102, the drill string 120 may be projecting above the reciprocating slip 161 and/or rig floor 114, and the reciprocating slip 161 may be in a closed position clamping the drill string 120. The iron roughneck 151 may then move to the drill string 120 and make up a connection between the drill string 120 and the suspended tubular, as described above. The reciprocating slip 161 may then open and the elevator 129 may be lowered to advance the drill string 120 into the wellbore 102. Once the drill string 120 has been advanced into the wellbore 102 such that the upper portion of the drill string 120 is near to the reciprocating slip 161, the reciprocating slip 161 may be closed to clamp the drill string 120, and the elevator 129 may be opened to release the drill string 120. The process may be repeated until the drill string 120 is advanced into the wellbore 102 such that the drill bit 126 contacts the bottom of the wellbore 102. The grabber of the top drive 116 may clamp the upper tubular of the drill string 120, and the drive shaft 125 may be driven to make up a connection with the drill string 120. The grabber may release the tubular and the drilling operations may resume.

The surface equipment 110 of the well construction system 100 may also comprise a control center 190 from which various portions of the well construction system 100, such as the hoisting system, the tubular handling system, the drilling fluid circulation system, the well control devices, and the BHA 124, among other examples, may be monitored and controlled. The control center 190 may be located on the rig floor 114 or another location of the well construction system 100, such as the wellsite surface 104. The control center 190 may contain or comprise a processing device 192 (e.g., a controller, a computer) operable to provide control to one or more portions of the well construction system 100 and/or operable to monitor operations of one or more portions of the well construction system 100. For example, the processing device 192 may be communicatively connected with the various surface and downhole equipment describe herein and operable to receive signals from and transmit signals to such equipment to perform various operations described herein. The processing device 192 may include an input device for receiving commands from a human wellsite operator 194 and an output device for displaying information to the wellsite operator 194. The processing device 192 may store executable programs and/or instructions, including for implementing one or more aspects of the operations described herein. Communication between the control center 190, the processing device 192, and the various wellsite equipment may be via wired and/or wireless communication means. However, for clarity and ease of understanding, such communication means are not depicted, and a person having ordinary skill in the art will appreciate that such communication means are within the scope of the present disclosure.

The well construction system 100 may further include a plurality of movable video cameras 196 disposed or utilized at various locations around and/or within the well construction system 100. The cameras 196 may be operable to capture photographs and/or videos of various components, portions, or subsystems of the well construction system 100 during drilling and other wellsite operations. The cameras 196 may be further operable to capture photographs and/or videos of the wellsite operators 194 and the actions they perform during or otherwise in association with the well site operations. For example, the cameras 196 may capture photographs and/or videos of the entire well construction system 100 and/or specific portions of the well construction system 100, such as the top drive 116, the iron roughneck 151, the PHM 163, the fingerboard 165, the catwalk 131, among other examples. The cameras 196 may further capture photographs and/or videos of the wellsite operator 194 performing wellsite operations, including while performing repairs to the well construction system 100 during a breakdown. The cameras 196 may be in signal communication with the control center 190, such as may permit the wellsite operators 194 to view various portions or components of the well construction system 100 on one or more audiovisual output devices, such as the processing device 192. The processing device 192 or another portion of the control center 190 may be operable to record photographs and/or video signals generated by the cameras 196.

A person of ordinary skill in the art will readily understand that a well construction system 100 within the scope of the present disclosure may include more or fewer components than what was described above and depicted in FIG. 1. Additionally, various components and/or subsystems of the well construction system 100 shown in FIG. 1 may include more or fewer components. For example, various engines, motors, hydraulics, actuators, valves, or the like that were not described herein, may be included as part of the well construction system 100 and are within the scope of the present disclosure.

Figure 2:
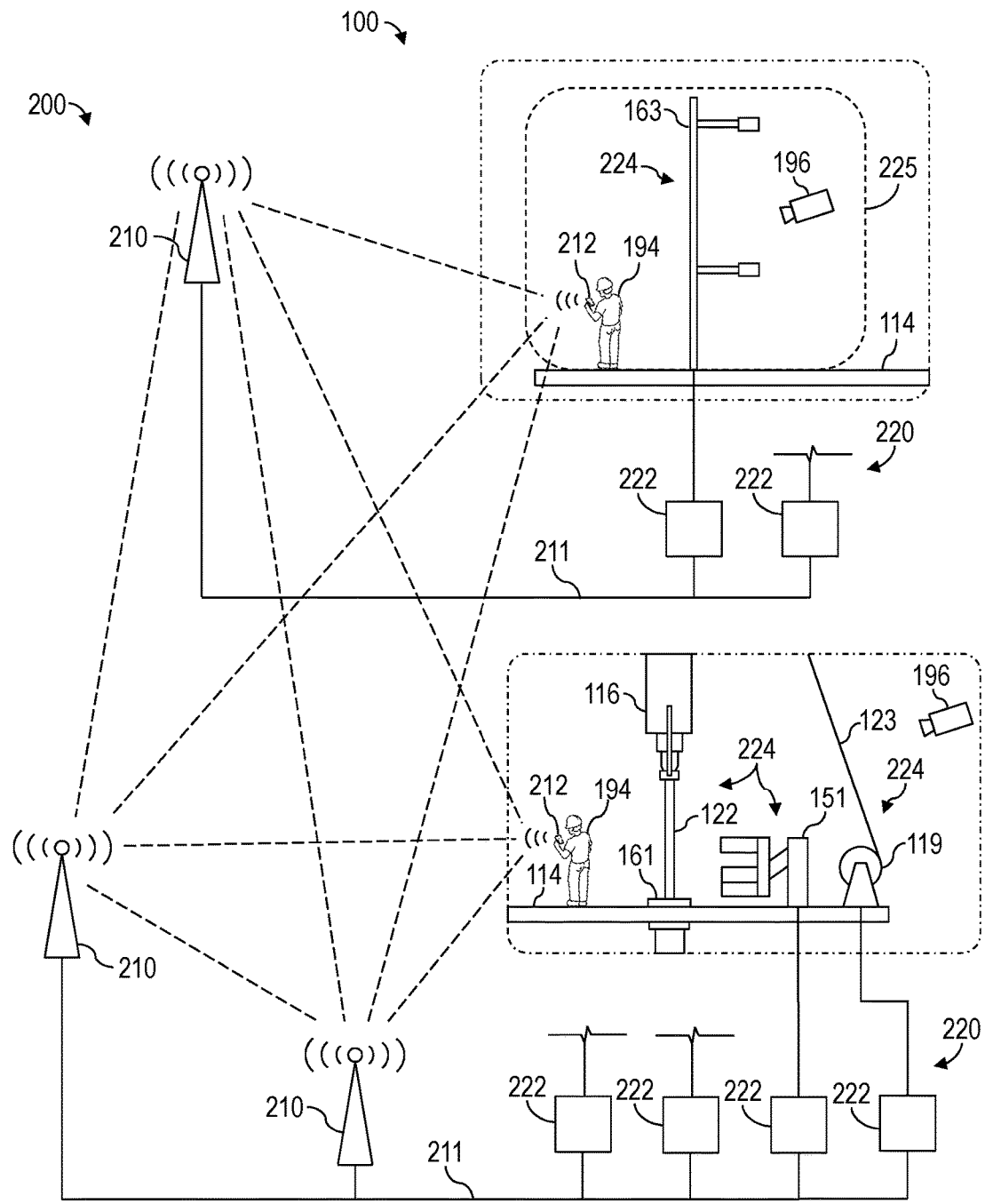
FIG. 2 is a schematic view of at least a portion of an example implementation of apparatus according to one or more aspects of the present disclosure.

FIG. 2 is a schematic view of at least a portion of an example implementation of a wireless safety system 200 according to one or more aspects of the present disclosure. The wireless safety system 200 may be operatively connected with or implemented as part of the well construction system 100 shown in FIG. 1. However, it is to be understood that the wireless safety system 200 may be operatively connected with or implemented as part of other well construction systems, mining sites, building construction sites, and/or other environments in which heavy automated machines or equipment that may cause bodily injury are utilized. The following description refers to FIGS. 1 and 2 collectively.

The wireless safety system 200 may comprise a plurality of wireless access points 210 (e.g., wireless base stations) disposed at various locations of the well construction system 100. For example, one or more of the wireless access points 210 may be mounted to the wellsite structure 112, the rig floor 114, and/or other surface equipment 110. One or more of the wireless access points 210 may also be mounted at various locations along the wellsite surface 104.

The wireless safety system 200 may further comprise or be electrically wired (i.e., electrically connected) with one or more portions of an electrical power system 220 of the well construction system 100. The electrical power system 220 may be or comprise a plurality of electrical power circuits 222 of various automated machines 224 of the surface equipment 110, whereby the wireless safety system 200 may be electrically wired with the individual electrical circuits 222 of the automated machines 224. In an example implementation, the electrical circuits 222 may be or comprise wired emergency stop circuits of the automated machines 224. Accordingly, when electrically wired with the wired emergency stop circuits, the wireless safety system 200 may be operable to operate selected one or more wired emergency stop circuits to quickly stop or deactivate the corresponding one or more automated machines 224 similarly as when a wired emergency stop button of the wired emergency stop circuit is pressed. The automated machines 224 within the scope of the present disclosure may include various electronically controlled automated machines collectively operable for construction of the oil and/or gas wellbore 102 at the wellsite surface 104. The automated machines 224 may include, for example, the iron roughneck 151, the PHM 163, the drawworks 119 (actuating the vertical movement of the top drive 116), the catwalk 131, and the solids and gas control equipment 170, among other examples. Each wireless access point 210 may be in wired signal communication with one or more electrical circuits 222 via a wired electrical/communication network 211, facilitating electrical power transmission and/or signal communication between the wireless access points 210 and the electrical circuits 222.

The wireless safety system 200 may further comprise a plurality of wireless communicators 212. Each wireless communicator 212 may be or comprise a wireless transmitter and/or receiver (e.g., a transceiver) operable to wirelessly communicate with one or more wireless access points 210 located within a communication range of the wireless communicator 212. The wireless communicators 212 and the wireless access points 210 may collectively form a wireless network having a ring, mesh, star, and/or other topology. Communication between the wireless access points 210 and the electrical circuits 222 may be facilitated via a wired connection, such as using a Universal Serial Bus (USB) connection and protocol or the like, while communication between the wireless access points 210 and the wireless communicators 212 may be facilitated via a wireless connection, such as radio frequency signals (e.g., Bluetooth, Wi-Fi, cellular network, and the like). Suitable wireless network may be adopted in accordance with the SIL level for the system per IEC 61508. In addition to the wireless network, components of the wireless safety system 200 and the electrical power system 220, including the electrical circuits 222, may be adopted in accordance with the functional safety requirements for the system, including processors, e-stop relays, etc. Relevant standards in addition to IEC 61508 may include IEC 62061 and ISO 13849-1. If a well construction system, such as the well construction system 100, incorporates or otherwise utilizes wired emergency stop circuits in association with the automated machines 224, the well construction system 100 may be upgraded to include a wireless safety system 200, such as by electrically wiring the wireless access points 210 to one or more wired emergency stop circuits, facilitating use of the wireless communicators 212.

The wireless safety system 200 may also or instead be communicatively coupled with the processing device 192, the control center 190, and/or another control system to ensure more efficient and safer drilling operations. For example, when the wireless communicator 212 is associated with one or more automated machines 224 or other drilling equipment, the control system (e.g., processing device 192, the control center 190) will be notified of such association (s), which may be indicate to the control system that wellsite operators 194 are working in vicinity of such automated equipment. The control system may then visually indicate presence of the wellsite operator 194 near the associated machines 224, as described below. The control system may be operated in a normal operational mode, in which the automated machines 224 are ran in a normal manner (e.g., normal speed) or the control system may be operated in a special operational mode (e.g., man on the rig floor mode, man near automated machine mode), in which the automated machines 224 are ran in an inhibited manner. For example, the control system may cause the plurality of machines 224 to operate at a faster (e.g., normal) speed and, upon association of one or more of the machines 224 with the wireless communicator 212, cause the associated machines 224 to operate at a slower (e.g., inhibited, slower than normal) speed. The rig control system may also or instead cause the one or more associated machines 224 to operate at a slower speed when the wellsite operator 194 is within a predetermined distance 225 from the one or more associated machines 224, and cause the one or more associated machines 224 to operate at a faster speed when the wellsite operator 194 is outside of the predetermined distance 225. Distance between the wellsite operator 194 and the associated machines 224 may be tracked via the plurality of cameras 196, various proximity sensors of the machines 224, radio frequency identification (RFID) tags or chips, and the wireless communicator 212 (as described below), among other examples. In the special operational mode, the drilling control system may automatically adjust safety monitoring systems (e.g., orient rig cameras 196) to point or otherwise be directed toward selected areas of the wellsite construction system 100 or toward the associated automated machines 224 to increase visibility of the wellsite operators 194 and/or the associated automated machines 224.

Figure 3:
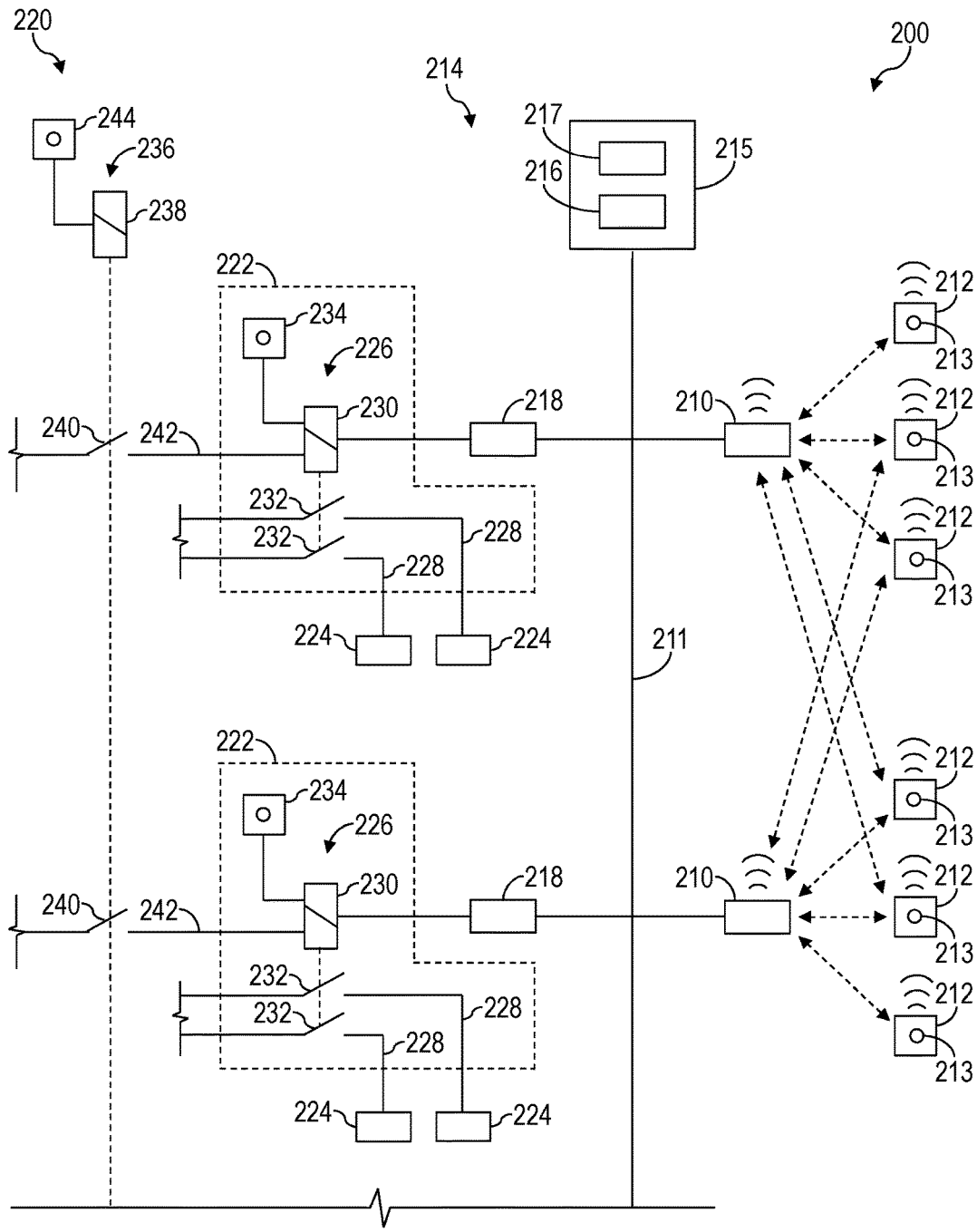
FIG. 3 is a schematic view of at least a portion of an example implementation of apparatus according to one or more aspects of the present disclosure.

FIG. 3 is a schematic view of at least a portion of an example implementation of the wireless safety system 200 shown in FIG. 2 electrically wired with a plurality of wired emergency stop circuits of the electrical circuits 222 according to one or more aspects of the present disclosure. Each wireless communicator 212 may be in wireless signal communication with one or more wireless access points 210. Each wireless access point 210, in turn, may be in wired signal communication with one or more electrical circuits 222 of the corresponding automated machines 224 via the wired network 211. The multiple (i.e., redundant) wired and wireless connections may facilitate multiple wired and wireless connections between a wireless communicator 212 and an electrical circuit 222.

Each electrical circuit 222 may comprise one or more local relay systems 226 selectively operable to disconnect (i.e., open) electrical conductors 228 feeding electrical power to a corresponding automated machine 224 or a portion of the automated machine 224 (e.g., an electrical actuator). The relay systems 226 may comprise an actuator 230 (e.g., a magnetic coil) operatively connected with one or more electrical switches 232 operable to disconnect the electrical conductors 228 and, thus, disconnect electrical power from the corresponding automated machines 224. When operated, such as by a local emergency stop button 234 (e.g., an electrical switch), the actuator 230 may operate the one or more electrical switches 232 to disconnect the electrical power from the corresponding automated machines 224. The electrical power system 220 may also comprise a central relay system 236 selectively operable to operate one or more of the local relay systems 226 of the electrical circuits 222. The central relay system 236 may comprise an actuator 238 (e.g., a magnetic coil) operatively connected with one or more electrical switches 240 connected along electrical conductors 242 connected with and operable to supply electrical power to the actuators 230. When operated, such as by a central emergency stop button 244 (e.g., an electrical switch), the actuator 238 may operate the one or more electrical switches 240 to connect electrical power to the corresponding actuators 230 to cut off electrical power to the corresponding automated machines 224. Although FIGS. 2 and 3 show the electrical circuits 222 as being separate and distinct from the corresponding automated machines 224, it is to be understood that the electrical circuits 222 may be located within or form at least a portion of the corresponding automated machines 224.

The wireless safety system 200 may further comprise a control system 214 communicatively connected with the wireless access points 210 and the electrical circuits 222 and operable to communicate with and/or operate or otherwise control at least a portion of each electrical circuit 222, such as upon receiving a predetermined signal or information from one or more of the wireless communicators 212 (via the wireless access points 210). The control system 214 may be communicatively connected with the wireless access points 210 and the electrical circuits 222 via the wired network 211.

The control system 214 may comprise a central controller 215 communicatively connected with the wireless access points 210 via the wired network 211. The central controller 215 may comprise a processing device 216 and a human machine interface (HMI) 217 operable to receive commands from the wellsite operators 194 and display information to the wellsite operators 194. The central controller 215 may be or form at least a portion of the processing device 192. The wireless safety system 200 may further comprise a plurality of local controllers 218 (e.g., signal transceivers, addressable electrical relays). Each local controller 218 may be communicatively connected with the central controller 215 via the wired network 211. Each local controller 218 may be electrically wired with a corresponding electrical circuit 222, such as may facilitate control of and/or communication with selected one or more of the electrical circuits 220. For example, each local controller 218 may be electrically wired with a corresponding actuator 230 of the relay system 226, permitting each local controller 218 to operate the actuator 230 and, thus, deactivate the automated machines 224 connected with the electrical circuit 222. The central controller 215 may be operable to receive signals or information sent by the wireless communicators 212 (via the wireless access points 210) and relay such signals or transmit corresponding control signals to one or more predetermined local controllers 218 to deactivate the corresponding one or more automated machines 224. However, instead of or in addition to utilizing the central controller 215, the signals or information sent by the wireless communicators 212 may be communicated directly by the wireless access points 210 to a selected one or more local controllers 218 to deactivate the corresponding one or more automated machines 224. Although the electrical power circuits 222 and the local controllers 218 are shown as separate elements electrically or otherwise communicatively connected, it is to be understood that one or more of electrical power circuits 222 and local controllers 218 may be implemented as a single processing unit or another piece of equipment, such as an e-stop relay module or card operable to both receive control commands and actuate or otherwise operate the electrical relays 232.

Each wireless communicator 212 may be paired, synchronized, or otherwise associated with one or more automated machines 224, such that the wireless communicator 212 may be operated to deactivate or otherwise control the one or more automated machines 224 the wireless communicator 212 is associated with. However, once one or more wireless communicators 212 and one or more automated machines 224 are associated with each other, the wireless communicators 212 may not be operable to deactivate automated machines 224 that are not associated with the wireless communicators 212. Associating one or more wireless communicators 212 with one or more predetermined automated machines 224 may prevent deactivation of automated machines 224 that do not pose danger to a wellsite operator 194. The associating process between the wireless communicators 212 and the automated machines 224 may be facilitated by associating (e.g., establishing communication) predetermined one or more wireless communicators 212 with predetermined one or more local controllers 218 electrically connected with the corresponding automated machines 224. Associating the wireless communicators 212 and the local controllers 218 may be accomplished by suitable paring technologies (e.g. NFC such as blue tooth) incorporated into the wireless communicator 212 or the associating process may be accomplished programmatically, such as by selecting one or more automated machines 224 via the central controller 215 and/or the wireless communicator 212. Each wireless communicator 212 and local controller 218 may comprise a unique identification code, address, and/or other identification information that may permit the wireless communicators 212 to operate, control, or otherwise communicate with the local controllers 218.

Each wireless communicator 212 may be attached to, worn by, or carried by an ambulatory wellsite operator 194 who operates the automated machines 224 or works in close proximity to the automated machines 224. When the wellsite operator 194 working alongside an associated automated machine 224 senses a danger (e.g., is trapped against an operating automated machine 224, piece of clothing is caught in the automated machine 224), the wellsite operator 194 may press an emergency stop button 213 of the wireless communicator 212, causing the associated automated machine 224 to be stopped similarly as when the wired local emergency stop button 234 of the automated machine 224 is activated. When the button 213 is pressed, the wireless communicator 212 may transmit a unique wireless signal or information to one or more wireless access points 210, which in turn, may communicate a unique electrical signal via the wired network 211 to the central controller 215. The central controller 215 may then transmit a corresponding electrical signal or information to one or more local controllers 218 associated with the wireless communicator 212 to cause the local controller 218 to operate the relay system 226 of the electrical circuit 222 to deactivate the one or more automated machines 224 electrically wired with the electrical circuit 222. However, as described above, the wireless access points 210 may communicate directly with the local controllers 218 to deactivate the associated automated machines 224.

Associating a wireless communicator 212 with an automated machine 224 or local controller 218 may be performed via the central controller 215, wherein the central controller 215 may be operable to receive from a wellsite operator 194 instructions indicative of which wireless communicators 212 are to be associated with which automated machines 224. The central controller 218 may be further operable to visually output or display a list of wireless communicators 212 utilized at the well construction system 100 and a list of the automated machines 224 and/or corresponding local controllers 218 utilized at the well construction system 100. The central controller 218 may also be operable to visually indicate which wireless communicators 212 are associated with which automated machines 224 and/or corresponding local controllers 218.

Figure 4:
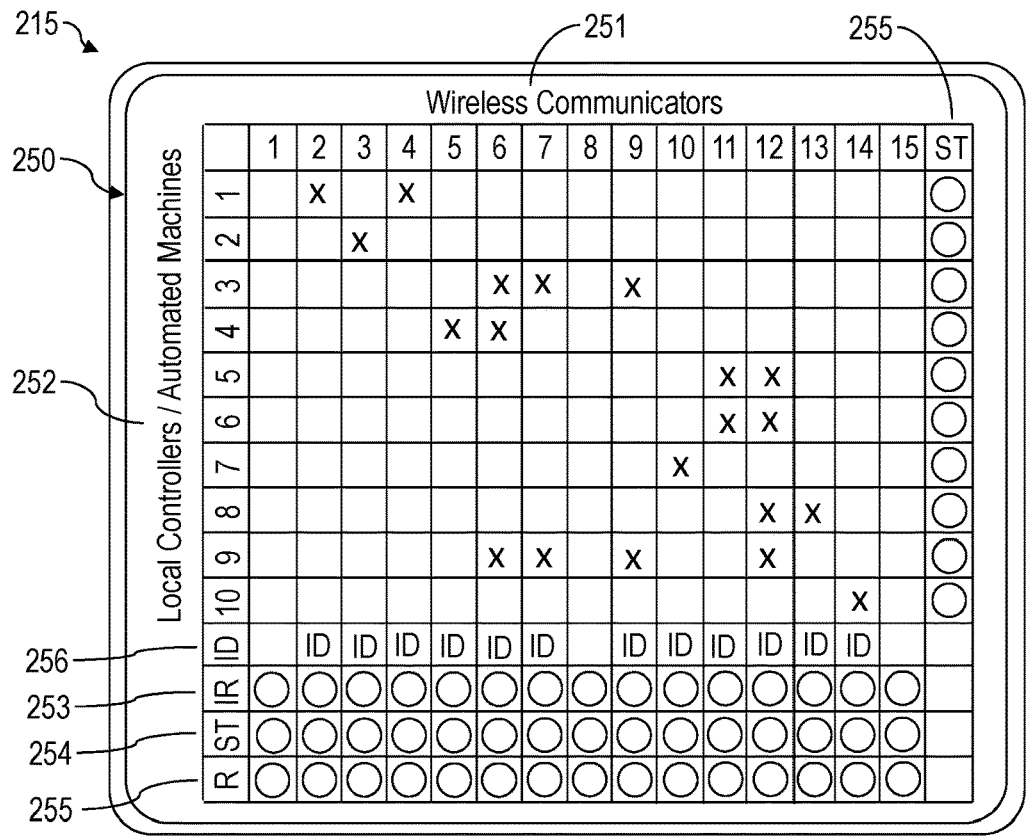
FIG. 4 is a view of at least a portion of an example implementation of apparatus according to one or more aspects of the present disclosure.

FIG. 4 is a view of at least a portion of an example video display 250, which may be generated by the central controller 215 and displayed on the HMI 217 according to one or more aspects of the present disclosure. The video display 250 may be utilized by the wellsite operators 194 to associate wireless communicators 212 with automated machines 224 and display an indication of such associations. The display 250 may comprise a list 251 of wireless communicators 212 utilized at the well construction system 100 along a horizontal axis and a list 252 of local controllers 218 and/or the corresponding automated machines 224 along a vertical axis to form a matrix of the wireless communicators 212 and the local controllers 218/automated machines 224. The lists 251, 252 may include unique identification numbers or network addresses of the wireless communicators 212 and local controllers 218. The lists 251, 252 may also or instead include arbitrary numbers or names assigned to the wireless communicators 212 and/or the automated machines 224. Although the display screen 250 shown fifteen wireless communicators 212 and ten local controllers 218/automated machines 224, it is to be understood that one or more wireless communicators 212 and local controllers 218/automated machines 224 may be taken out of service and not displayed and that additional wireless communicators 212 and local controllers 218/automated machines 224 may be added to the wireless safety system 200 and displayed on the display screen 250. The HMI 217 may be operated by the wellsite operator 194 carrying the wireless communicator 212 or by another wellsite operator 194 (e.g., supervisor) who may utilize the display screen 250 to associate the automated machines 224 with the wireless communicators 212, while the wellsite operator 194 carrying the wireless communicator 212 works on or near the automated machines 224.

For example, if two well site operators 194 who are carrying wireless communicators 212 number 2 and 4 are operating or working in close proximity to automated machine 224 number 1, then a wellsite operator 194 utilizing the central controller 215 may click on or otherwise select with an input device boxes or cells associated with wireless communicators 212 number 2 and 4 and the automated machine 224 number 1 to associate the wireless communicators 212 number 2 and 4 with the automated machine 224 number 1. Similarly, if a wellsite operators 194 who is carrying wireless communicator 212 number 6 is operating or working in close proximity to automated machines 224 number 3 and 4, then a wellsite operator 194 utilizing the central controller 215 may click on or otherwise select with an input device boxes or cells associated with wireless communicator 212 number 6 and the automated machines 224 number 3 and 4 to associate the wireless communicator 212 number 6 with the automated machines 224 number 3 and 4. The remaining wireless communicators 212 may be associated with the remaining automated machines 224 in a similar manner. Once a cell is selected, a visual indicator (e.g., an X, a dot, a light) may appear in the selected cell to indicate the association between the wireless communicator 212 and the automated machine 224, such as to visually keep track of which wireless communicators 212 are associated with which automated machines 224.

The central controller 215 or another processing device may cause the display screen 250 to visually indicate to the wellsite operator 194 additional information related to the association and emergency stop processes. For example, a visual indicator 253 may appear on the display screen 250 when a wellsite operator 194 carrying a wireless communicator 212 provides an input (e.g., presses the button 213) to the wireless communicator 212 to cause the wireless communicator 212 to transmit a wireless signal. The visual indicator 253 may inform the supervising wellsite operator 194 of an emergency event. The visual indicator 253 may include an X, a dot, a light, or another visual indicator that may appear in association with a corresponding wireless communicator 212 when an input from the wellsite operator 194 was received by the wireless communicator 212. The visual indicators 253 may be arranged in a row along the horizontal axis, with each visual indicator 253 being aligned with the corresponding wireless communicator 212. The visual indicators 253 may be labeled (e.g., input received (IR)) to identify the function or purpose of the visual indicators 253.

The central controller 215 may further cause a visual indicator 254 to appear on the display screen 250 when the wireless communicator 212 transmits the wireless signal in response to the wellsite operator 194 providing the input to the wireless transmitter 212. The visual indicator 254 may inform the supervising wellsite operator 194 of a successful emergency stop wireless transmission. The visual indicator 254 may appear in association with a corresponding wireless communicator 212 when the wireless communicator 212 transmitted the wireless signal. The visual indicators 254 may be arranged in a row along the horizontal axis, with each visual indicator 254 being aligned with the corresponding wireless communicator 212. The visual indicators 254 may be labeled (e.g., signal sent (ST)) to identify the function or purpose of the visual indicators 254.

The central controller 215 may also cause a visual indicator 255 to appear on the display screen 250 when the central controller 215 receives an electrical stop signal from the wireless access point 210 and transmits a corresponding electrical signal to the associated automated machine 224 to cause the associated automated machine 224 to stop operating. The visual indicator 255 may inform the supervising wellsite operator 194 that the central controller 215 has attempted to cause the associated automated machine 224 to stop operating. The visual indicator 255 may appear on the display screen 250 in association with a corresponding local controller/automated machine 252 when the central controller 215 transmits the electrical stop signal. The visual indicators 255 may be arranged in a column along the vertical axis, with each visual indicator 255 being aligned with the corresponding local controller/automated machine 252. The visual indicators 255 may be labeled (e.g., signal transmitted (ST)) to identify the function or purpose of the visual indicators 255.

The central controller 215 may be further operable to perform a reset operation to clear or erase the programmed associations from a selected one or more wireless communicators 212 and/or the central controller 215. For example, the display screen 250 may comprise a plurality of reset (R) boxes or buttons 255 each associated with a corresponding wireless communicator 212, which when pressed via an input device, may clear or erase the programmed associations from the corresponding wireless communicator 212 and/or the central controller 215. A wireless communicator 212 may be reset when, for example, the wellsite operator 194 completes a project with the automated machine(s) 224 or is otherwise not working alongside the automated machine(s) 224, such as to prevent accidental activation of the wireless communicator 212. As described below, the wireless communicator 212 may also or instead be operable to clear the programmed associations from the wireless communicator 212 and/or the central controller 215, such as via a reset button located on the wireless communicator 212.

The wireless communicators 212 may also or instead be utilized to operate as wireless lockout/tagout devices. For example, a wellsite operator 194 carrying a wireless communicator 212 may press the emergency stop button 213 of the wireless communicator 212 to lockout/tagout (i.e., deactivate) the automated machines 224 associated with the wireless communicator 212, such as to prevent the automated machine 212 from being operated from another station and/or permit the wellsite operator 194 to safely repair or work in close proximity to the automated machine 224.

A selected wireless communicator 212 may also be associated with a selected one or more automated machines 224 by a wellsite operator 194 via the wireless communicator 212 the wellsite operator 194 is carrying. For example, the wireless communicator 212 may be operable to receive information from the wellsite operator 194 indicative of the one or more automated machines 224 that the wellsite operator 194 will be working in close proximity to. The wireless communicator 212 may comprise an HMI, which may include, for example, a plurality of buttons operable to receive input from the wellsite operator 194, a screen and/or plurality of lights operable to output information to the wellsite operator 194, and/or a touchscreen operable to both receive and output information to the wellsite operator 194.

The wireless communicator 212 may also be associated with a specific wellsite operator 194, such as may facilitate location tracking of the associated wellsite operator 194. The central controller 215 may be operable to receive the identification information (e.g., name, employee identification number) of the wellsite operator 194 using the HMI 217 to associate the wireless communicator 212 with the wellsite operator 194 and/or the wireless communicator 212 may be operable to receive the identification information of the wellsite operator 194 using the wireless communicator 212. The central controller 215 may be further operable to display on the display screen 250 the identifications (ID) 256 (e.g., name, initials, employee identification number) of each wellsite operator 194 in association with a corresponding wireless communicator 212, such as to visually indicate the associations. The identifications 256 may be arranged in a row along the horizontal axis, with each identifier 256 being aligned with the associated wireless communicator 212.

Figure 5:
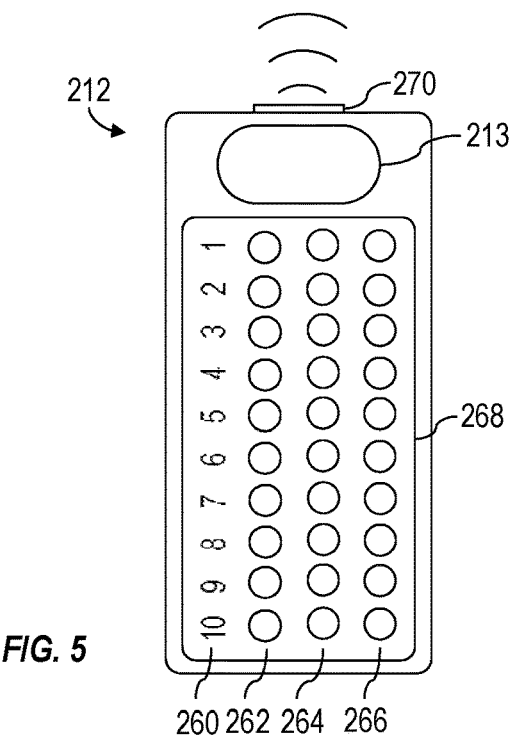
FIG. 5 is a view of at least a portion of an example implementation of apparatus according to one or more aspects of the present disclosure.

FIG. 5 is a view of at least a portion of an example wireless communicator 212 shown in FIGS. 2 and 3 according to one or more aspects of the present disclosure. The wireless communicator 212 may comprise an emergency stop button 213 (e.g., an electromechanical button) operable to cause the wireless communicator 212 to transmit to one or more wireless access points 210 a wireless signal or information to deactivate one or more automated machines 224 associated with the wireless communicator 212, as described above. The wireless communicator 212 may display a list 260 of local controllers 218 and/or automated machines 224 at the well construction system 100 and a plurality of buttons 262, each located adjacent a corresponding automated machine number. One or more of the buttons 262 may be pressed to associate the wireless communicator 212 with one or more corresponding automated machines 224. The wireless communicator 212 may communicate the association information to the central controller 215, which may facilitate, permit, or otherwise establish communication between the wireless communicator 212 and the selected automated machines 224 and, thus, associate the wireless communicator 212 and the selected automated machines 224. The wireless communicator 212 may further include a plurality of lights 264 operable to indicate to the wellsite operator 194 when the programmed associations were successfully established, such as when communication between the wireless communicator 212 and the selected one or more automated machines (i.e., via the local controllers 218) was successfully established. The wireless communicator 212 may be further operable to perform a reset operation to clear or erase the programmed associations from the wireless communicator 212. For example, the wireless communicator 212 may comprise a plurality of buttons 266 each corresponding to an automated machine 224, which when pressed, may clear or erase the association with the corresponding automated machine 224.

The list 260 of local controllers 218/automated machines 224, the associating buttons 262, the indicator lights 264, and the reset buttons 266 may be or comprise discrete physical elements (e.g., electromechanical buttons, light-emitting diodes (LEDs)) integrated into or forming the wireless communicator 212. However, the wireless communicator 212 may also or instead comprise a touchscreen 268 or another electronic screen (e.g., a liquid crystal display (LCD)) that may display the list 260, the associating buttons 262, the indicator lights 264, and the reset buttons 266 as virtual or software elements. Furthermore, instead of or in addition to displaying virtual lights and buttons, the wireless communicator 212 may display the association and confirmation information in digital format (e.g., letters, numbers). The wireless communicator 212 may be electrically powered by one or more electrical batteries (not shown) housed within the wireless communicator 212. The wireless communicator 212 may include a clip or a fastener (not shown) operable to affix the wireless communicator 212 to the wellsite operator's clothing (e.g., a belt). The wireless communicator 212 may also or instead include a support cord or string (not shown), such as may permit the wireless communicator 212 to be worn or carried around a wellsite operator's neck.

Figure 6:
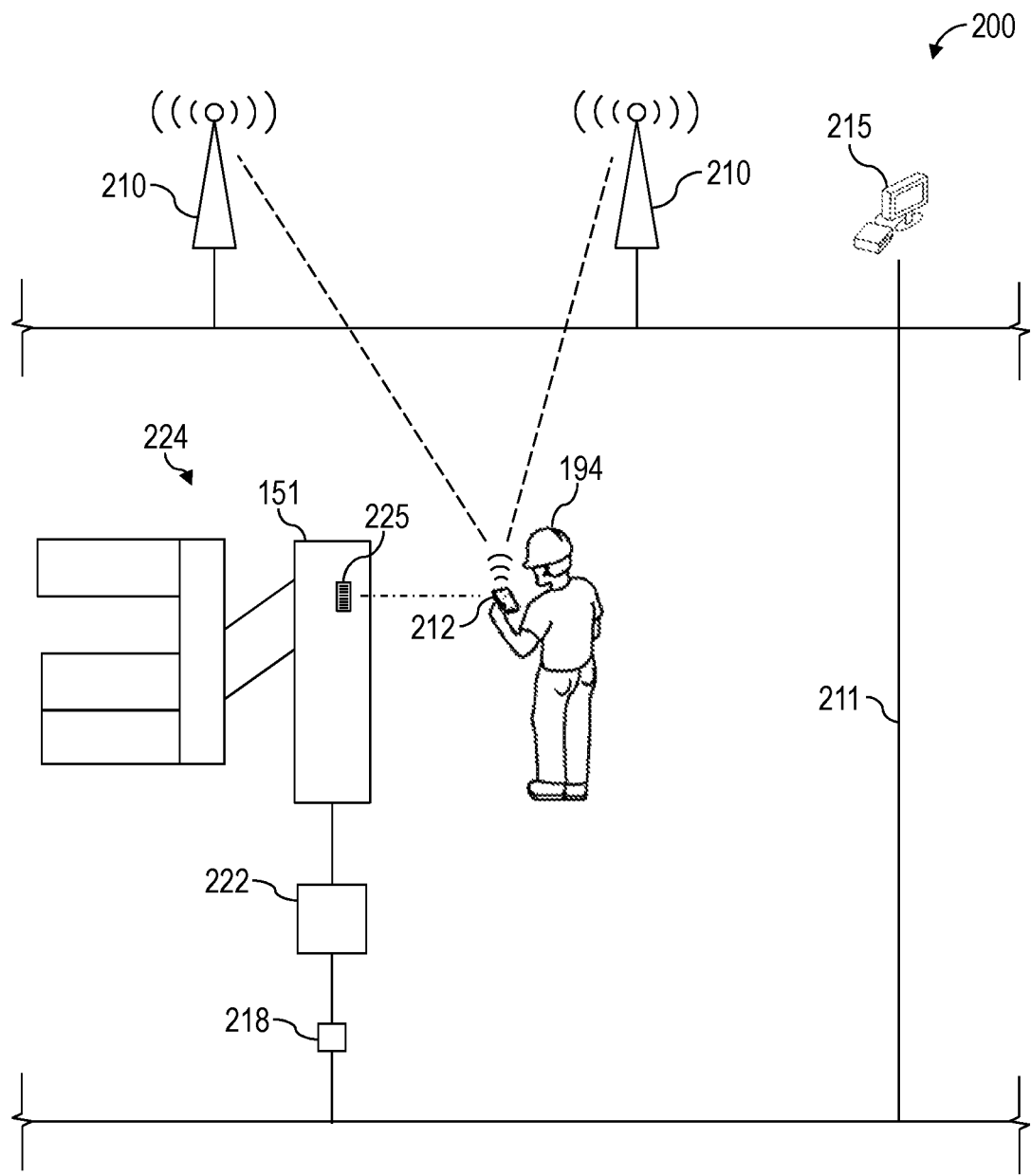
FIG. 6 is a schematic view of at least a portion of an example implementation of apparatus according to one or more aspects of the present disclosure.

One or more automated machines 224 may also be associated with a wireless communicator 212 by a wellsite operator 194 while being present at or in close proximity to the one or more automated machines 224. FIG. 6 is a schematic view of at least a portion of the wireless safety system 200 electrically connected with an automated machine 224 according to one or more aspects of the present disclosure. The following description refers to FIGS. 5 and 6 collectively.

The wireless communicator 212 may comprise a wireless reader or scanning device 270 (e.g., infrared (IR) scanner, bar code scanner, a magnetic scanner, RFID reader, and the like) or another sensor operable to wirelessly scan or otherwise receive identification information of an automated machine 224 to associate the automated machine 224 with the wireless communicator 212. For example, the automated machine 224, such as the iron roughneck 151, may include an identification tag, device, or another element 225 (e.g., RFID tag or chip, a barcode tag, a magnetic strip, and the like) operable to pass to the wireless communicator 212 data or information identifying the automated machine 224 and/or the local controller 218 associated with the automated machine 224. Accordingly, the wireless communicator 212 may be utilized to scan the identification element 225 of the automated machine 224 and transmit the identification information of the automated machine 224 and its own identification information to the central controller 215 via one or more wireless access points 210. The central controller 215 may then permit, facilitate, and/or establish communication between the wireless communicator 212 and the local controller 218 electrically connected with the electrical circuit 222 of the automated machine 224 via the wired communication network 211 to associate the wireless communicator 212 and the automated machine 224 and, thus, permit the wireless communicator 212 to deactivate the automated machine 224 when the emergency stop button 213 is pressed. If the wellsite operator 194 is working in proximity to multiple automated machines 224, additional one or more automated machines 224 may be associated with the same wireless communicator 212 in a similar manner.

As described above, the wireless communicator 212 may also be associated with a specific wellsite operator 194, such as may facilitate location tracking of the associated wellsite operator 194. The central controller 215 may be operable to receive the identification information (e.g., name, employee identification number) of the wellsite operator 194 using the HMI 217 to associate the wireless communicator 212 with the wellsite operator 194 and/or the wireless communicator 212 may be operable to receive the identification information of the wellsite operator 194 using the wireless communicator 212. When utilizing the wireless communicator 212, the identification information may be typed into the wireless communicator 212 or the wireless communicator 212 may be utilized to scan an identification device or element (not shown), such as a name tag, carried by the wellsite operator 194. The identification information may then be transmitted to the central controller 215, which may associate the wellsite operator 194 with the wireless communicator 212. The location of the wireless communicator 212 and, thus, the wellsite operator 194, may be tracked by the central controller 215 or another controller of the well construction system 100, such as via wireless communication signals between the wireless communicator 212 and the wireless access points 210 (e.g., wireless signal triangulation) and/or wireless communication signals between the wireless communicator 212 and RFID transmitters/tags (not shown) located at various locations of the well construction system 100.

Figure 7:
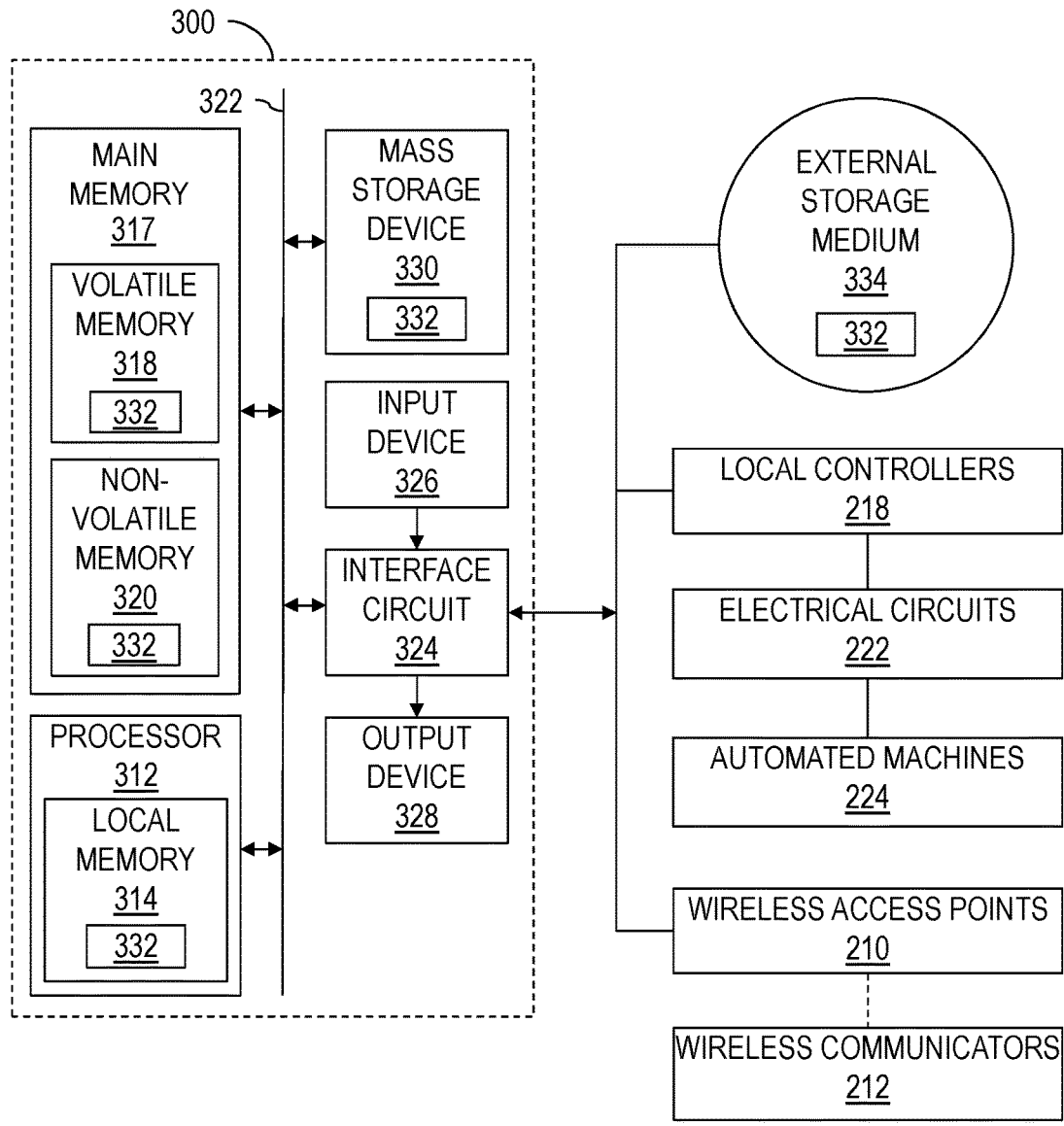
FIG. 7 is a schematic view of at least a portion of an example implementation of apparatus according to one or more aspects of the present disclosure.

FIG. 7 is a schematic view of at least a portion of an example implementation of a processing device 300 according to one or more aspects of the present disclosure. The processing device 300 may form at least a portion of one or more electronic devices utilized at the well construction system 100. For example, the processing device 300 may be or form at least a portion of the processing devices 188, 192. The processing device 300 may further be or form at least a portion of the central controller 215 and/or the local controllers 218. The processing device 300 may also be or form at least a portion of the wireless access points 210 and/or the wireless communicators 212.

When implemented as the processing device 192 and/or the central controller 215, the processing device 300 may be in communication with various sensors, actuators, and communication devices forming the well construction system 100, including the local controllers 218 to operate the automated machines 224 and the wireless access points 210 to establish wireless communication with the wireless communicators 212. The processing device 300 may be operable to receive coded instructions 342 from the wellsite operators 194 and information received from the wireless communicators 212, process the coded instructions 342 and the information, and communicate control signals to the local controllers 218 to execute the coded instructions 342 to implement at least a portion of one or more example methods and/or operations (e.g., deactivate an automated machine 224) described herein, and/or to implement at least a portion of one or more of the example systems described herein.

The processing device 300 may be or comprise, for example, one or more processors, special-purpose computing devices, servers, personal computers (e.g., desktop, laptop, and/or tablet computers) personal digital assistant (PDA) devices, smartphones, internet appliances, and/or other types of computing devices. The processing device 300 may comprise a processor 312, such as a general-purpose programmable processor. The processor 312 may comprise a local memory 314, and may execute coded instructions 342 present in the local memory 314 and/or another memory device. The processor 312 may execute, among other things, the machine-readable coded instructions 342 and/or other instructions and/or programs to implement the example methods and/or operations described herein. The programs stored in the local memory 314 may include program instructions or computer program code that, when executed by an associated processor, facilitate the automated machines 224 and/or other portions of the well construction system 100 to perform the example methods and/or operations described herein. The processor 312 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 312 may be in communication with a main memory 317, such as may include a volatile memory 318 and a non-volatile memory 320, perhaps via a bus 322 and/or other communication means. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 320 may be, comprise, or be implemented by read-only memory, flash memory, and/or other types of memory devices. One or more memory controllers (not shown) may control access to the volatile memory 318 and/or non-volatile memory 320.

The processing device 300 may also comprise an interface circuit 324. The interface circuit 324 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 324 may also comprise a graphics driver card. The interface circuit 324 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the local controllers 218 and wireless access points 210 may be connected with the processing device 300 via the interface circuit 324, such as may facilitate communication between the processing device 300 and the local controllers 218 and wireless access points 210.

One or more input devices 326 may also be connected to the interface circuit 324. The input devices 326 may permit the wellsite operators 194 to enter the coded instructions 342, such as control commands, processing routines, input data, association information, identification information, and network addresses. The input devices 326 may be, comprise, or be implemented by a keyboard, a mouse, a joystick, a touchscreen, a track-pad, a trackball, an isopoint, and/or a voice recognition system, among other examples. One or more output devices 328 may also be connected to the interface circuit 324. The output devices 328 may be, comprise, or be implemented by display devices (e.g., an LCD, an LED display, or cathode ray tube (CRT) display), printers, and/or speakers, among other examples. The processing device 300 may also communicate with one or more mass storage devices 340 and/or a removable storage medium 344, such as may be or include floppy disk drives, hard drive disks, compact disk (CD) drives, digital versatile disk (DVD) drives, and/or USB and/or other flash drives, among other examples.

The coded instructions 342 may be stored in the mass storage device 340, the main memory 317, the local memory 314, and/or the removable storage medium 344. Thus, the processing device 300 may be implemented in accordance with hardware (perhaps implemented in one or more chips including an integrated circuit, such as an ASIC), or may be implemented as software or firmware for execution by the processor 312. In the case of firmware or software, the implementation may be provided as a computer program product including a non-transitory, computer-readable medium or storage structure embodying computer program code (i.e., software or firmware) thereon for execution by the processor 312. The coded instructions 342 may include program instructions or computer program code that, when executed by the processor 312, may cause the automated machines 224 or other portions of the well construction system 100 to perform intended methods, processes, and/or operations disclosed herein.

Figure 8:
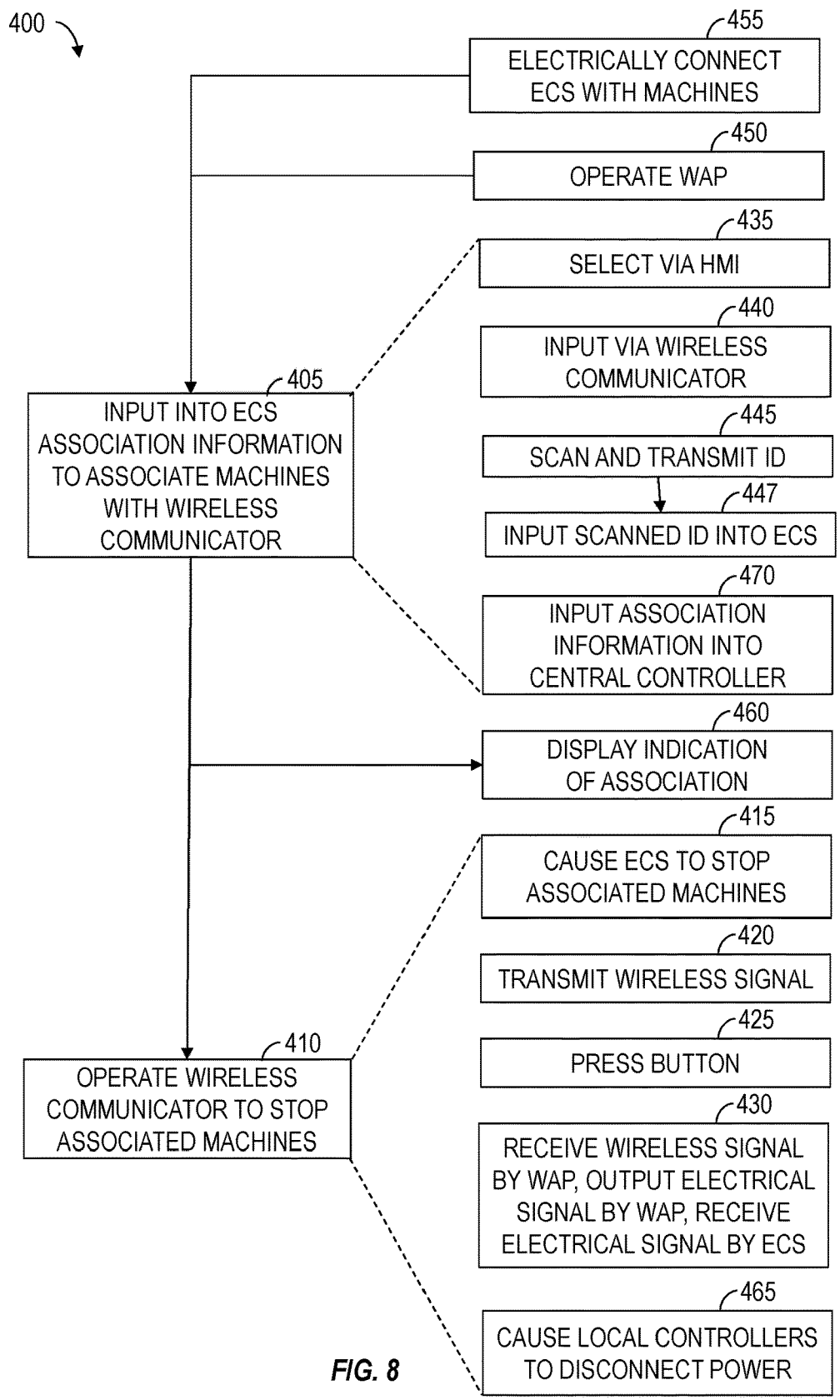
FIG. 8 is a flow-chart diagram of at least a portion of an example implementation of a method according to one or more aspects of the present disclosure.
Figure 9:
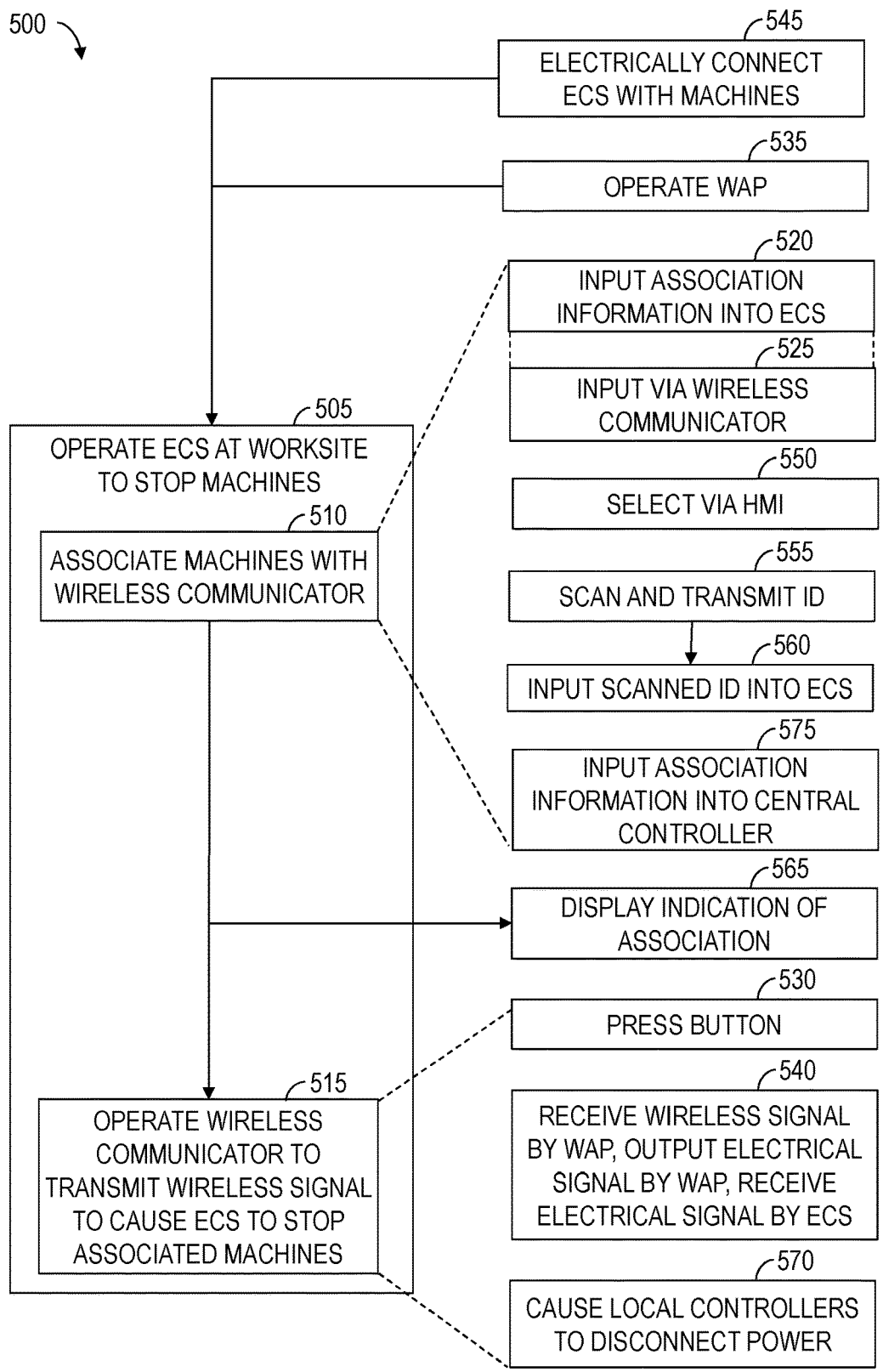
FIG. 9 is a flow-chart diagram of at least a portion of an example implementation of a method according to one or more aspects of the present disclosure.

FIGS. 8 and 9 are flow-chart diagrams of at least a portion of example implementations of methods (400), (500) according to one or more aspects of the present disclosure. The methods (400), (500) described below and/or other operations described herein may be performed utilizing or otherwise in conjunction with at least a portion of one or more implementations of one or more instances of the apparatus shown in one or more of FIGS. 1-7 and/or otherwise within the scope of the present disclosure. However, the methods (400), (500) and operations described herein may be performed in conjunction with implementations of apparatus other than those depicted in FIGS. 1-7 that are also within the scope of the present disclosure. The methods (400), (500) and operations may be performed manually by one or more wellsite operators 194 and/or performed or caused, at least partially, by the processing device 300 executing coded instructions 332 according to one or more aspects of the present disclosure. For example, the processing device 300 may receive input signals and automatically generate and transmit output signal to operate or cause a change in an operational parameter of one or more pieces of the wellsite equipment described above. However, the wellsite operator 194 may also or instead manually operate the one or more pieces of wellsite equipment via the processing device 300 based on sensor signals displayed.

Referring to FIG. 8, the method (400) may comprise inputting (405) into an electrical control system (ECS) 214 association information indicative of which one or more of a plurality of electronically controlled automated machines 224 at a worksite 100 are to be associated with a wireless communicator 212, and operating (410) the wireless communicator 212 to cause the one or more associated machines 224 to stop operating. The worksite 100 may be or comprise a wellsite 100, and the plurality of machines 224 may be collectively operable for construction of an oil and/or gas well 102 at the wellsite 100.

In an example implementation of the method (400), operating (410) the wireless communicator 212 may cause (415) the electrical control system 214 to stop operations of the one or more associated machines 224. Operating (410) the wireless communicator 212 may further cause the wireless communicator 212 to transmit (420) a wireless signal to cause the one or more associated machines 224 to stop operating. Furthermore, operating (410) the wireless communicator 212 may comprise pressing (425) a button 213 of the wireless communicator 212 to cause the wireless communicator 212 to transmit the wireless signal.

The method (400) may further comprise operating (450) a wireless access point (WAP) 210 to establish communication between the wireless communicator 212 and the electrical control system 214. Thus, the method (400) may comprise (430) receiving the wireless signal by a wireless access point 210, outputting an electrical signal by the wireless access point 210 based on the received wireless signal, and receiving the electrical signal by the electrical control system 214.

Inputting (405) into the electrical control system 214 the association information may comprise selecting (435) via a human-machine interface (HMI) 217 which one or more of the plurality of machines 224 are to be caused to stop operating upon operating of the wireless communicator 212. Inputting (405) into the electrical control system 214 the association information may comprise inputting (440) into the electrical control system 214 the association information via the wireless communicator 212.

The method (400) may further comprise (445) scanning with the wireless communicator 212 identification information (ID) from identification tags 225 of the one or more of the plurality of machines 224 that are to be associated and transmitting with the wireless communicator 212 the scanned identification information. Accordingly, inputting (405) into the electrical control system 214 the association information may comprise inputting (447) into the electrical control system 214 the scanned identification information indicative of which one or more of the plurality of machines 224 at the worksite are to be associated with the wireless communicator 212.

The method (400) may further comprise electrically connecting (455) the electrical control system 214 with the plurality of machines 224 at the worksite 100. In an example implementation, electrically connecting (455) the electrical control system 214 with the plurality of machines 224 may comprise electrically connecting the electrical control system 214 with electrical circuits 222 of the plurality of machines 224 and, thus, the method (400) may further comprise causing the electrical control system 214 to disconnect electrical power from the one or more associated machines 224. In another example implementation, electrically connecting the electrical control system 214 with the electrical circuits 222 of the plurality of machines 224 may comprise electrically connecting the electrical control system 214 with emergency stop electrical circuits 222 of the plurality of machines 224. Thus, causing the electrical control system 214 to disconnect electrical power from the one or more associated machines 224 may comprise operating one or more electrical relays 226 of the emergency stop electrical circuits 222 to disconnect electrical power from the one or more associated machines 224.

The method (400) may further comprise displaying (460) on a visual output device 217, 250 an indication 251,252 of the association between the wireless communicator 212 and the one or more of the plurality of machines 224. The method (400) may also or instead comprise displaying on the visual output device 217, 250 another indication 253 that a human has provided input into the wireless communicator 212 causing the wireless communicator 212 to operate, displaying on the visual output device 217, 250 another indication 254 that the wireless communicator 212 was caused to operate by transmitting a wireless signal, displaying on the visual output device 217, 250 another indication 255 that the electrical control system 214 has attempted to cause the one or more associated machines 224 to stop operating, and/or displaying on the visual output device 217, 250 identification 256 of a human wearing the wireless communicator 212.

The wireless communicator 212 may be one of a plurality of wireless communicators 212 each carried by a corresponding human 194, whereby operating (410) the electrical control system 214 may comprise inputting into the electrical control system 214 association information indicative of which one or more of the plurality of machines 224 are to be associated with which one or more of the plurality of wireless communicators 212, and operating one or more of the plurality of wireless communicators 212 to cause the one or more associated machines 224 to stop operating.

The electrical control system may comprise a plurality of local controllers 218 each electrically connected with a corresponding one of the plurality of machines 224, whereby operating (410) the wireless communicator 212 to cause the one or more associated machines 224 with the wireless communicator 212 to stop operating may comprise operating the wireless communicator 212 to cause (465) one or more of the plurality of local controllers 218 to cause electrical power to be disconnect from the one or more associated machines 224. The electrical control system 214 may further comprise a central controller 215 communicatively connected with the plurality of local controllers 218 via a wired communication network 211, whereby inputting into the electrical control system 214 the association information may comprise inputting (470) into the central controller 215 the association information.

Referring now to FIG. 9, the method (500) may comprise operating (505) an electrical control system (ECS) 214 at a worksite 100 to stop operations of one or more of a plurality of electronically controlled automated machines 224 associated with a wireless communicator 212 by: associating (510) one or more of the plurality of machines 224 with the wireless communicator 212 and operating (515) the wireless communicator 212 to transmit a wireless signal to cause the electrical control system 214 to stop operation of the one or more associated machines 224. In an example implementation, operating (515) the wireless communicator 212 to transmit the wireless signal may comprise pressing (530) a button 213 of the wireless communicator 212 to transmit the wireless signal. The worksite 100 may be or comprise a wellsite 100, and the plurality of machines 224 may be collectively operable for construction of an oil and/or gas well at the wellsite 100.

In an example implementation of the method (500), associating (510) the one or more of the plurality of machines 224 with the wireless communicator 212 may comprise inputting (520) into the electrical control system 214 the information associating the one or more of the plurality of machines 224 with the wireless communicator 212. Inputting (520) into the electrical control system 214 the information associating the one or more of the plurality of machines 224 with the wireless communicator 212 may comprise inputting (525) into the electrical control system 214 via the wireless communicator 212 the information associating the one or more of the plurality of machines 224 with the wireless communicator 212.

Associating (510) the one or more of the plurality of machines 224 with the wireless communicator 212 may comprise selecting (550) via a human-machine interface (HMI) 217 which one or more of the plurality of machines 224 are to be caused to stop operating upon operating of the wireless communicator 212. The method (500) may further comprise (555) scanning with the wireless communicator 212 identification information (ID) from identification tags 225 of the machines 224 that are to be associated and transmitting with the wireless communicator 212 the scanned identification information. Accordingly, associating (510) the one or more of the plurality of machines 224 with the wireless communicator 212 may comprise inputting (560) into the electrical control system 214 the scanned identification information associating one or more of the plurality of machines 224 with the wireless communicator 212.

The method (500) may further comprise operating (535) a wireless access point (WAP) 210 to establish communication between the wireless communicator 212 and the electrical control system 214. Thus, the method (500) may further comprise (540) receiving the wireless signal by a wireless access point 210, outputting an electrical signal by the wireless access point 210 based on the received wireless signal, and receiving the electrical signal by the electrical control system 214.

The method (500) may further comprise electrically connecting (545) the electrical control system 214 with the plurality of machines 224 at the worksite 100. In an example implementation, electrically connecting (545) the electrical control system 214 with the plurality of machines 224 may comprise electrically connecting the electrical control system 214 with electrical circuits 222 of the plurality of machines 224 and, thus, the method (500) may further comprise causing the electrical control system 214 to disconnect electrical power from the one or more associated machines 224. In another example implementation, electrically connecting the electrical control system 214 with the electrical circuits 222 of the plurality of machines 224 may comprise electrically connecting the electrical control system 214 with emergency stop electrical circuits 222 of the plurality of machines 224. Thus, causing the electrical control system 214 to disconnect electrical power from the one or more associated machines 224 may comprise operating one or more electrical relays 226 of the emergency stop electrical circuits 222 to disconnect electrical power from the one or more associated machines 224.

The method (500) may further comprise displaying (565) on a visual output device 217, 250 an indication 251, 252 of the association between the wireless communicator 212 and one or more of the plurality of machines 224. The method (500) may also or instead comprise displaying on the visual output device 217, 250 another indication 253 that a human 194 has provided input into the wireless communicator 212 causing the wireless communicator 212 to transmit the wireless signal, displaying on the visual output device 217, 250 another indication 254 that the wireless communicator 212 has transmitted the wireless signal, displaying on the visual output device 217, 250 another indication 255 that the electrical control system 214 has attempted to cause the one or more associated machines 224 to stop operating, and/or displaying on the visual output device 217, 250 identification 256 of a human wearing the wireless communicator 212.

The wireless communicator 212 may be one of a plurality of wireless communicators 212 each carried by a corresponding human 194, whereby operating (505) the electrical control system 214 may further comprise associating each of the plurality of wireless communicators 212 with different ones of the plurality of machines 224, and operating one or more of the plurality of wireless communicators 212 to transmit a corresponding wireless signal to cause the electrical control system 214 to stop operation of the one or more associated machines 224.

The electrical control system 214 may comprise a plurality of local controllers 218 each electrically connected with a corresponding one of the plurality of machines 224, whereby causing (515) the electrical control system 214 to stop operation of the one or more associated machines 224 may comprise operating (570) one or more of the plurality of local controllers 218 to cause electrical power to be disconnect from the one or more associated machines 224. The electrical control system 214 may further comprise a central controller 215 communicatively connected with the plurality of local controllers 218 via a wired communication network, whereby associating (510) the one or more of the plurality of machines 224 with the wireless communicator 212 may comprise inputting (575) into the central controller 215 the information associating the one or more of the plurality of machines 224 with the wireless communicator 212.

In view of the entirety of the present disclosure, including the figures and the claims, a person having ordinary skill in the art will recognize that the present disclosure introduces an apparatus comprising: (A) a wireless communicator to be worn by an ambulatory human at a wellsite, wherein the wireless communicator is operable to transmit a wireless signal; (B) a wireless access point located at the wellsite and operable to: (1) receive the wireless signal; and (2) output an electrical signal based on the received wireless signal; and (C) a control system located at the wellsite and comprising a processor and a memory storing computer program code, wherein the control system is operable to: (1) electrically communicate with a plurality of electronically controlled machines collectively operable for construction of an oil and/or gas well at the wellsite; (2) associate one of the machines with the wireless communicator; (3) receive the electrical signal; and (4) cause the associated machine to stop operating based on receipt of the electrical signal.

The wireless communicator may be operable to transmit the wireless signal in response to input from the human via a button of the wireless communicator.

The wireless access point may be in wired communication with the control system.

The control system may be operable to cause the associated machine to stop operating by causing electrical power to be disconnected from the associated machine.

Each machine may comprise an emergency stop electrical circuit, and the control system may be operable to cause the associated machine to stop operating by operating at least a portion of the emergency stop electrical circuit of the associated machine.

The control system may be operable to select which of the machines to associate with the wireless communicator based on input from the human via a human-machine interface.

The control system may be operable to select which of the machines to associate with the wireless communicator based on input from another human via a human-machine interface.

The control system may be operable to select which of the machines to associate with the wireless communicator based on identification information scanned by the wireless communicator from an identification tag of the machine to be associated.

The control system may comprise a visual output device, and may be operable to cause the visual output device to display an indication of the association between the wireless communicator and the associated machine. The control system may be operable to cause the visual output device to display an indication that the human has provided input into the wireless communicator causing the wireless communicator to transmit the wireless signal. The control system may be operable to cause the visual output device to display an indication that the wireless communicator has transmitted the wireless signal. The control system may be operable to cause the visual output device to display an indication that the control system has attempted to cause the associated machine to stop operating in response to receipt of the electrical signal. The control system may be operable to cause the visual output device to display an identification of the human wearing the wireless communicator.

The wireless communicator may be one of a plurality of wireless communicators that is selected by the human, wherein the plurality of wireless communicators may be associated with different ones of the machines by the control system, and wherein the human-selected wireless communicator may be selected by the human based on the machine associated with that wireless communicator.

The ambulatory human may be one of a plurality of ambulatory humans at the wellsite, the wireless communicator may be one of a plurality of wireless communicators each to be worn by a corresponding one of the plurality of ambulatory humans, and each wireless communicator may be operable to transmit a corresponding wireless signal. The wireless access point may be operable to receive the wireless signals from the plurality of wireless communicators and output corresponding electrical signals based on the received wireless signals, and the control system may be operable to: associate one or more of the machines with one or more of the wireless communicators; receive the electrical signals; and cause one or more associated machines to stop operating based on receipt of one or more of the corresponding electrical signals.

The control system may comprise: a plurality of local controllers each corresponding to a different one of the machines; and a central controller operable to receive the electrical signal and, in response to said receipt, transmit a stop signal to the local controller corresponding to the associated machine to cause the associated machine to stop operating. Each local controller may be operable to cause operation of the corresponding machine to stop by disconnecting electrical power from the corresponding machine.

The control system may comprise a visual output device, and may be operable to cause the visual output device to display an indication of which one of the machines is associated with the wireless communicator to visually indicate presence of the human near the associated machine.

The control system may be operable to: cause the associated machine to operate at a first speed when the human is within a predetermined distance from the associated machine; and cause the associated machine to operate at a second speed when the human is outside of the predetermined distance from the associated machine, wherein the second speed is substantially greater than the first speed.

The control system may be operable to: cause the plurality of machines to operate at a first speed; and upon association of one of the machines with the wireless communicator, cause the associated machine to operate at a second speed substantially slower than the first speed.

The control system may be communicatively connected with a plurality of video cameras at the wellsite, and upon association of one of the machines with the wireless communicator, the control system may be operable to cause one or more of the video cameras to be moved to or directed toward the associated machine.

The present disclosure also introduces a method comprising: inputting into an electrical control system association information indicative of which one or more of a plurality of electronically controlled automated machines at a worksite are to be associated with a wireless communicator; and operating the wireless communicator to cause the one or more associated machines to stop operating.

Operating the wireless communicator may cause the electrical control system to stop operations of the one or more associated machines.

Operating the wireless communicator may cause the wireless communicator to transmit a wireless signal to cause the one or more associated machines to stop operating. Operating the wireless communicator may comprise pressing a button of the wireless communicator to cause the wireless communicator to transmit the wireless signal. The method may further comprise: receiving the wireless signal by a wireless access point; outputting an electrical signal by the wireless access point based on the received wireless signal; and receiving the electrical signal by the electrical control system.

Inputting the association information into the electrical control system may comprise selecting via a human-machine interface which one or more of the plurality of machines are to be caused to stop operating upon operating of the wireless communicator.

Inputting the association information into the electrical control system may comprise inputting into the electrical control system the association information via the wireless communicator.

The method may further comprise: scanning, with the wireless communicator, identification information from identification tags of the one or more of the plurality of machines that are to be associated; and transmitting, with the wireless communicator, the scanned identification information. Inputting the association information into the electrical control system may comprise inputting the scanned identification information indicative of which one or more of the plurality of machines at the worksite are to be associated with the wireless communicator.

The method may comprise operating a wireless access point to establish communication between the wireless communicator and the electrical control system.

The worksite may be or comprise a wellsite, and the plurality of machines may be collectively operable for construction of an oil and/or gas well at the wellsite.

The method may comprise electrically connecting the electrical control system with the plurality of machines at the worksite. Electrically connecting the electrical control system with the plurality of machines may comprise electrically connecting the electrical control system with electrical circuits of the plurality of machines, and the method may comprise causing the electrical control system to disconnect electrical power from the one or more associated machines. Electrically connecting the electrical control system with the electrical circuits of the plurality of machines may comprise electrically connecting the electrical control system with emergency stop electrical circuits of the plurality of machines, and causing the electrical control system to disconnect electrical power from the one or more associated machines may comprise operating one or more electrical relays of the emergency stop electrical circuits to disconnect electrical power from the one or more associated machines.

The method may comprise displaying on a visual output device an indication of the association between the wireless communicator and the one or more of the plurality of machines. The method may comprise displaying on the visual output device an indication that a human has provided input into the wireless communicator causing the wireless communicator to operate. The method may comprise displaying on the visual output device an indication that the wireless communicator was caused to operate by transmitting a wireless signal. The method may comprise displaying on the visual output device an indication that the electrical control system has attempted to cause the one or more associated machines to stop operating. The method may comprise displaying on the visual output device identification of a human wearing the wireless communicator.

The wireless communicator may be a one of a plurality of wireless communicators each carried by a corresponding human, and operating the electrical control system may comprise: inputting into the electrical control system association information indicative of which one or more of the plurality of machines are to be associated with which one or more of the plurality of wireless communicators; and operating one or more of the plurality of wireless communicators to cause the one or more associated machines to stop operating.

The electrical control system may comprise a plurality of local controllers each electrically connected with a corresponding one of the plurality of machines, and operating the wireless communicator to cause the one or more associated machines with the wireless communicator to stop operating may comprise operating the wireless communicator to cause one or more of the plurality of local controllers to cause electrical power to be disconnected from the one or more associated machines. The electrical control system may comprise a central controller communicatively connected with the plurality of local controllers via a wired communication network, and inputting the association information into the electrical control system may comprise inputting the association information into the central controller.

The method may comprise visually displaying an indication of which one or more of the machines are associated with the wireless communicator to visually indicate presence of a human operator near the one or more associated machines.

Inputting the association information into the electrical control system may cause the electrical control system to: operate the one or more associated machines at a first speed when a human operator is within a predetermined distance from the one or more associated machines; and operate the one or more associated machines at a second speed when the human operator is outside of the predetermined distance from the one or more associated machines, wherein the second speed is substantially greater than the first speed.

Inputting the association information into the electrical control system may cause the electrical control system to operate the one or more associated machines at a reduced speed.

Inputting the association information into the electrical control system may cause the electrical control system to operate one or more video cameras at the worksite to be moved to or directed toward the one or more associated machines.

The present disclosure also introduces a method comprising operating an electrical control system at a worksite to stop operations of one or more of a plurality of electronically controlled automated machines associated with a wireless communicator by: associating one or more of the plurality of machines with the wireless communicator; and operating the wireless communicator to transmit a wireless signal to cause the electrical control system to stop operation of the one or more associated machines.

Associating the one or more of the plurality of machines with the wireless communicator may comprise inputting into the electrical control system the information associating the one or more of the plurality of machines with the wireless communicator. Inputting into the electrical control system the information associating the one or more of the plurality of machines with the wireless communicator may comprise inputting into the electrical control system via the wireless communicator the information associating the one or more of the plurality of machines with the wireless communicator.

Operating the wireless communicator to transmit the wireless signal may comprise pressing a button of the wireless communicator to transmit the wireless signal.

The method may comprise operating a wireless access point to establish communication between the wireless communicator and the electrical control system.

Operating the electrical control system may comprise: receiving the wireless signal by a wireless access point; outputting an electrical signal by the wireless access point based on the received wireless signal; and receiving the electrical signal by the electrical control system.

The worksite may be or comprise a wellsite, and the plurality of machines may be collectively operable for construction of an oil and/or gas well at the wellsite.

The method may comprise electrically connecting the electrical control system with the plurality of machines at the worksite. Electrically connecting the electrical control system with the plurality of machines may comprise electrically connecting the electrical control system with electrical circuits of the plurality of machines, and causing the electrical control system to stop operation of the one or more associated machines may comprise causing the electrical control system to disconnect electrical power from the one or more associated machines. Electrically connecting the electrical control system with the electrical circuits of the plurality of machines may comprise electrically connecting the electrical control system with emergency stop electrical circuits of the plurality of machines, and causing the electrical control system to disconnect electrical power from the one or more associated machines may comprise operating one or more electrical relays of the emergency stop electrical circuits to disconnect electrical power from the one or more associated machines.

Associating the one or more of the plurality of machines with the wireless communicator may comprise selecting via a human-machine interface which one or more of the plurality of machines are to be caused to stop operating upon operating of the wireless communicator.

The method may comprise: scanning with the wireless communicator identification information from identification tags of the machines that are to be associated; and transmitting with the wireless communicator the scanned identification information. Associating the one or more of the plurality of machines with the wireless communicator may comprise inputting into the electrical control system the scanned identification information associating one or more of the plurality of machines with the wireless communicator.

The method may comprise displaying on a visual output device an indication of the association between the wireless communicator and one or more of the plurality of machines. The method may comprise displaying on the visual output device an indication that a human has provided input into the wireless communicator causing the wireless communicator to transmit the wireless signal. The method may comprise displaying on the visual output device an indication that the wireless communicator has transmitted the wireless signal. The method may comprise displaying on the visual output device an indication that the electrical control system has attempted to cause the one or more associated machines to stop operating. The method may comprise displaying on the visual output device identification of a human wearing the wireless communicator.

The wireless communicator may be a one of a plurality of wireless communicators each carried by a corresponding human, and operating the electrical control system may comprise: associating each of the plurality of wireless communicators with different ones of the plurality of machines; and operating one or more of the plurality of wireless communicators to transmit a corresponding wireless signal to cause the electrical control system to stop operation of the one or more associated machines.

The electrical control system may comprise a plurality of local controllers each electrically connected with a corresponding one of the plurality of machines, and causing the electrical control system to stop operation of the one or more associated machines may comprise operating one or more of the plurality of local controllers to cause electrical power to be disconnected from the one or more associated machines. The electrical control system may comprise a central controller communicatively connected with the plurality of local controllers via a wired communication network, and associating the one or more of the plurality of machines with the wireless communicator ma comprise inputting into the central controller the information associating the one or more of the plurality of machines with the wireless communicator.

The method may comprise visually displaying an indication of which one or more of the plurality of machines are associated with the wireless communicator to visually indicate presence of a human operator near the one or more associated machines.

Associating one or more of the plurality of machines with the wireless communicator may cause the electrical control system to: operate the one or more associated machines at a first speed when a human operator is within a predetermined distance from the one or more associated machines; and operate the one or more associated machines at a second speed when the human operator is outside of the predetermined distance from the one or more associated machines, wherein the second speed is substantially greater than the first speed.

Associating one or more of the plurality of machines with the wireless communicator may cause the electrical control system to operate the one or more associated machines at a reduced speed.

Associating one or more of the plurality of machines with the wireless communicator may cause the electrical control system to operate one or more video cameras at the worksite to be moved to or directed toward the one or more associated machines.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A system comprising:
    a wireless communicator to be worn by an ambulatory human at a wellsite, wherein the wireless communicator is operable to transmit a wireless signal;
    a wireless access point located at the wellsite and operable to:
        receive the wireless signal; and
        output an electrical signal based on the received wireless signal; and
    a control system located at the wellsite and comprising a processor and a memory storing computer program code, wherein the control system is operable to:
        electrically communicate with a plurality of electronically controlled machines collectively operable for construction of an oil and/or gas well at the wellsite;
        associate one of the machines with the wireless communicator;
        receive the electrical signal; and
        cause the associated machine to stop operating based on receipt of the electrical signal;
    wherein the control system comprises a visual output device and is operable to cause the visual output device to display a visual indication of presence of the human near the associated machine.

2. The system of claim 1 wherein the wireless communicator is operable to transmit the wireless signal in response to input from the human via a button of the wireless communicator.

3. The system of claim 1 wherein the wireless access point is in wired communication with the control system.

4. The system of claim 1 wherein the control system is operable to cause the associated machine to stop operating by causing electrical power to be disconnected from the associated machine.

5. The system of claim 1 wherein each machine comprises an emergency stop electrical circuit, and wherein the control system is operable to cause the associated machine to stop operating by operating at least a portion of the emergency stop electrical circuit of the associated machine.

6. The system of claim 1 wherein the wireless communicator is one of a plurality of wireless communicators that is selected by the human, wherein the plurality of wireless communicators are associated with different ones of the machines by the control system, and wherein the human-selected wireless communicator is selected by the human based on the machine associated with that wireless communicator.

7. The system of claim 1 wherein:
the ambulatory human is one of a plurality of ambulatory humans at the wellsite;
the wireless communicator is one of a plurality of wireless communicators each to be worn by a corresponding one of the plurality of ambulatory humans;
each wireless communicator is operable to transmit a corresponding wireless signal;
the wireless access point is operable to receive the wireless signals from the plurality of wireless communicators and output corresponding electrical signals based on the received wireless signals; and
the control system is further operable to:
associate one or more of the machines with one or more of the wireless communicators;
receive the electrical signals; and
cause one or more associated machines to stop operating based on receipt of one or more of the corresponding electrical signals.

8. The system of claim 1 wherein the control system comprises:
a plurality of local controllers each corresponding to a different one of the machines; and
a central controller operable to receive the electrical signal and, in response to said receipt, transmit a stop signal to the local controller corresponding to the associated machine to cause the associated machine to stop operating.

9. The system of claim 1 wherein the control system is operable to select which of the machines to associate with the wireless communicator based on input from the human via a human-machine interface.

10. The system of claim 1 wherein the control system is operable to select which of the machines to associate with the wireless communicator based on input from another human via a human-machine interface.

11. The system of claim 1 wherein the control system is operable to select which of the machines to associate with the wireless communicator based on identification information scanned by the wireless communicator from an identification tag of the machine to be associated.

12. The system of claim 1 wherein the control system is operable to cause the visual output device to display another indication of the association between the wireless communicator and the associated machine.

13. The system of claim 1 wherein the control system is operable to cause the visual output device to display another indication that the human has provided input into the wireless communicator causing the wireless communicator to transmit the wireless signal.

14. The system of claim 1 wherein the control system is operable to cause the visual output device to display another indication that the wireless communicator has transmitted the wireless signal.

15. The system of claim 1 wherein the control system is operable to cause the visual output device to display another indication that the control system has attempted to cause the associated machine to stop operating in response to receipt of the electrical signal.

16. The system of claim 1 wherein the control system is operable to cause the visual output device to display an identification of the human wearing the wireless communicator.

17. The system of claim 16 wherein each local controller is operable to cause operation of the corresponding machine to stop by disconnecting electrical power from the corresponding machine.

18. The system of claim 1 wherein the control system is further operable to:
cause the associated machine to operate at a first speed when the human is within a predetermined distance from the associated machine; and
cause the associated machine to operate at a second speed when the human is outside of the predetermined distance from the associated machine, wherein the second speed is substantially greater than the first speed.

19. The system of claim 1 wherein the control system is further operable to:
cause the plurality of machines to operate at a first speed; and
upon association of one of the machines with the wireless communicator, cause the associated machine to operate at a second speed substantially slower than the first speed.

20. The system of claim 1 wherein the control system is communicatively connected with a plurality of video cameras at the wellsite, and wherein, upon association of one of the machines with the wireless communicator, the control system is further operable to cause one or more of the video cameras to be moved to or directed toward the associated machine.

* * * * *